(12) United States Patent
Isenhour et al.

(10) Patent No.: US 8,622,632 B2
(45) Date of Patent: Jan. 7, 2014

(54) SMALL-FORM-FACTOR FIBER OPTIC INTERFACE ASSEMBLIES FOR ELECTRONIC DEVICES HAVING A CIRCUIT BOARD

(75) Inventors: Micah C. Isenhour, Lincolnton, NC (US); Dennis M. Knecht, Hickory, NC (US); James P. Luther, Hickory, NC (US)

(73) Assignee: Corning Incorporated, Corning, NY (US)

( * ) Notice: Subject to any disclaimer, the term of this patent is extended or adjusted under 35 U.S.C. 154(b) by 274 days.

(21) Appl. No.: 13/050,705

(22) Filed: Mar. 17, 2011

(65) Prior Publication Data

US 2011/0229089 A1    Sep. 22, 2011

Related U.S. Application Data

(60) Provisional application No. 61/315,420, filed on Mar. 19, 2010.

(51) Int. Cl.
*G02B 6/38* (2006.01)

(52) U.S. Cl.
USPC .............................................. 385/78; 385/89

(58) Field of Classification Search
USPC ................... 385/88–95, 147, 78–80
See application file for complete search history.

(56) References Cited

U.S. PATENT DOCUMENTS

| | | | |
|---|---|---|---|
| 4,213,677 A | 7/1980 | Sugimoto et al. | 350/96.18 |
| 4,268,112 A | 5/1981 | Peterson | 350/96.18 |
| 4,701,011 A | 10/1987 | Emkey et al. | 350/96.18 |
| 5,155,784 A * | 10/1992 | Knott | 385/88 |
| 5,172,271 A | 12/1992 | Sinclair | 359/652 |
| 5,384,874 A | 1/1995 | Hirai et al. | 385/34 |
| 5,418,875 A | 5/1995 | Nakano et al. | 385/77 |
| 5,784,512 A | 7/1998 | Hensen | 385/61 |
| 5,832,153 A | 11/1998 | Duck | 385/34 |
| 5,850,493 A | 12/1998 | Cheng | 385/34 |
| 5,923,802 A | 7/1999 | Giebel et al. | 385/76 |
| 6,012,852 A | 1/2000 | Kadar-Kallen et al. | 385/74 |
| 6,033,125 A | 3/2000 | Stillie et al. | 385/75 |

(Continued)

FOREIGN PATENT DOCUMENTS

| | | |
|---|---|---|
| AU | 199898138 B2 | 8/1999 |
| JP | 63-293510 | 11/1988 |
| WO | WO01/11409 A2 | 2/2001 |
| WO | WO03/076993 A1 | 9/2003 |

OTHER PUBLICATIONS

W. J. Tomlinson, "Applications of GRIN-rod lenses in optical fiber communications systems," Applied Optics, Apr. 1, 1980, vol. 19, No. 7, pp. 1127-1138.

(Continued)

*Primary Examiner* — Akm Enayet Ullah

(57) ABSTRACT

Small-form-factor fiber optic interface assemblies (180) for electronic devices (100) are disclosed. The fiber optic interface assemblies include a receptacle (120) configured to matingly engage with a plug (20) of a fiber optic cable assembly (10). Example assemblies include a flexible mount (228) supported by a circuit board (150) and configured to absorb a mechanical force when the plug is mated to the receptacle. The receptacle aperture (223) has at least one transverse dimension (L, W) of between about 2 mm and 4 mm. The assemblies can support both optical and electrical communication and functionality.

25 Claims, 26 Drawing Sheets

(56) References Cited

U.S. PATENT DOCUMENTS

| | | | |
|---|---|---|---|
| 6,157,485 A | 12/2000 | Cheng | 359/495 |
| 6,217,230 B1* | 4/2001 | Matsushita | 385/78 |
| 6,246,026 B1 | 6/2001 | Vergeest | 219/121.72 |
| 6,419,399 B1 | 7/2002 | Loder et al. | 385/53 |
| 6,542,665 B2 | 4/2003 | Reed et al. | 385/34 |
| 6,632,025 B2 | 10/2003 | Ukrainczyk | 385/70 |
| 6,655,850 B2 | 12/2003 | Mann et al. | 385/74 |
| 6,687,424 B1 | 2/2004 | Gerdt et al. | 385/34 |
| 6,736,547 B2 | 5/2004 | Stevens et al. | 385/61 |
| 6,837,625 B2 | 1/2005 | Schott et al. | 385/60 |
| 6,899,464 B2 | 5/2005 | Stevens et al. | 385/53 |
| 6,963,687 B2 | 11/2005 | Vergeest et al. | 385/123 |
| 7,077,576 B2 | 7/2006 | Luther et al. | 385/59 |
| 7,104,701 B1 | 9/2006 | Durrant et al. | 385/74 |
| 7,329,050 B1 | 2/2008 | Dugan et al. | 385/55 |
| 7,346,236 B2 | 3/2008 | Asano et al. | 385/34 |
| 7,346,237 B2 | 3/2008 | Matsumura et al. | 385/34 |
| 7,357,005 B2 | 4/2008 | Matsumura et al. | 65/387 |
| 7,460,750 B2 | 12/2008 | Durrant et al. | 385/35 |
| 7,572,071 B1 | 8/2009 | Wu | 385/94 |
| 7,603,008 B2 | 10/2009 | Matsumura et al. | 385/35 |
| 7,670,063 B2 | 3/2010 | Ice | 385/92 |
| 7,775,725 B2 | 8/2010 | Grinderslev | 385/74 |
| 2001/0041030 A1* | 11/2001 | Chen et al. | 385/88 |
| 2002/0146211 A1 | 10/2002 | Stevens et al. | 385/61 |
| 2003/0012513 A1 | 1/2003 | Ukrainczyk | 385/61 |
| 2003/0021543 A1 | 1/2003 | Mann et al. | 385/74 |
| 2004/0009697 A1 | 1/2004 | Clark et al. | 439/362 |
| 2006/0222299 A1 | 10/2006 | Durrant et al. | 385/74 |
| 2008/0050072 A1 | 2/2008 | Durrant et al. | 385/74 |
| 2008/0279509 A1 | 11/2008 | Durrant et al. | 385/72 |
| 2009/0041412 A1 | 2/2009 | Danley et al. | 385/85 |
| 2009/0182911 A1* | 7/2009 | Krasner et al. | 710/63 |
| 2009/0324175 A1 | 12/2009 | Everett et al. | 385/72 |
| 2009/0324176 A1 | 12/2009 | Cheng et al. | 385/73 |
| 2010/0002112 A1 | 1/2010 | Tay | 348/294 |
| 2010/0021112 A1* | 1/2010 | Moriarty et al. | 385/89 |
| 2010/0027943 A1 | 2/2010 | Armani et al. | 385/74 |
| 2010/0104244 A1 | 4/2010 | Grinderslev | 385/74 |
| 2010/0215325 A1 | 8/2010 | Tamura et al. | 385/89 |
| 2012/0099822 A1 | 4/2012 | Kuffel et al. | 385/78 |

OTHER PUBLICATIONS

Emkey, et al., "Analysis and Evaluation of Graded-Index Fiber-Lenses," Journal of Lightwave Technology, vol. LT-5, No. 9, Sep. 1987, pp. 1156-1164.
Palais, Joseph C, "Fiber coupling using graded-index rod lenses," Applied Optics, Jun. 15, 1980, vol. 19, No. 12, pp. 2011-2018.
http:\\www.cvimellesgroit.com, "Gradient-Index Lenses".
Chanclou, et al., "Design and demonstration of a multicore single-mode fiber coupled lens device," Optics Communications 233, 2004, pp. 333-339.
Senior, et al., "Misalignment losses at multimode graded-index fiber splices and GRIN rod lens couplers," Applied Optics, Apr. 1, 1985, vol. 24, No. 7, pp. 977-983.
Gilsdorf, et al., "Single-mode fiber coupling efficiency with graded-index rod lenses," Applied Optics, Jun. 1, 1994, vol. 33, No. 16, pp. 3440-3445.
Cusworth, et al., "Angular tilt misalignment loss at a GRIN rod lens coupler," Applied Optics, Jun. 1, 1986, vol. 25, No. 11, pp. 1775-1779.
Patent Cooperation Treaty, International Search Report and Written Opinion, May 24, 2011, 8 pgs.
PCT Search Report, May 24, 2011, pp. 1-2.

* cited by examiner

SMALL-FORM-FACTOR FIBER OPTIC INTERFACE ASSEMBLIES FOR ELECTRONIC DEVICES HAVING A CIRCUIT BOARD

CLAIM OF PRIORITY

This application claims the benefit of priority under 35 U.S.C. §119(e) of U.S. Provisional Application Ser. No. 61/315,420, filed on Mar. 19, 2010.

FIELD

The disclosure generally relates to fiber optic interfaces for electronic devices, and in particular relates to small-form-factor fiber optic interface assemblies for electronic devices.

BACKGROUND

Consumer electronic devices are increasingly being provided with optical communication capability. Such capability requires the use of integrated optical engines (also called integrated photonic modules) that have optical transmit and receive functions based on converting electrical signals to outgoing optical signals and incoming optical signals to electrical signals. The outgoing and incoming (transmit and receive) optical signals are typically carried from and to the device by respective transmit and receive optical waveguides, e.g., optical fibers of a fiber optic cable. A dual-fiber fiber optic cable configuration allows for fast, bi-directional communication between the device and an external device. A fiber optic interface assembly is used to convert the incoming ("receive") optical signals into corresponding electrical signals, and to convert the outgoing electrical signals into corresponding "transmit" optical signals.

The preferred fiber optic cable is configured so that it can be readily connected to and disconnected from the electronic device. This can be accomplished using a fiber optic plug configured to readily mate and unmate with a receptacle built in to the electronic device.

However, as consumer electronic devices shrink in size, the usual configurations for the fiber optic plug and receptacle becomes increasingly more difficult to implement. Accordingly, there is a need for fiber optic interface devices and assemblies more suitable for use with increasingly smaller electronic devices.

SUMMARY

An aspect of the disclosure is a fiber optic interface assembly for an electronic device having a circuit board and for interfacing with an external fiber optic cable having a plug. The assembly includes an integrated optical engine configured to transmit and receive respective transmit and receive optical signals. The assembly also includes a receptacle integrally formed with the integrated optical engine and having a receptacle aperture configured to receive the plug of the external fiber optic cable. The receptacle aperture having at least one transverse dimension between about 2 mm and 4 mm. The receptacle is supported by a flexible mount which is supported by the circuit board. The flexible mount is configured to absorb a mechanical force when the plug is mated to the receptacle.

Another aspect of the disclosure is a fiber optic interface assembly for an electronic device for interfacing with a plug of a fiber optic cable. The assembly includes a circuit board having an end with an enclosure support area formed therein, the enclosure support area having opposite edges and a back end. The assembly also has an optical transmitter and an optical receiver operably disposed on the circuit board and respectively configured to transmit and receive respective transmit and receive optical signals. The assembly further includes a central enclosure configured to support a receptacle ferrule. The central enclosure and receptacle ferrule defining a receptacle having at least one transverse dimension of between about 2 mm and 4 mm. The assembly also includes an enclosure support structure configured to flexibly support the central enclosure within the enclosure support area so that the receptacle ferrule is operably arranged relative to the optical transmitter and optical receiver.

Another aspect of the disclosure is a fiber optic interface assembly for an electronic device having a housing, for interfacing with an external fiber optic cable having a plug. The assembly includes a circuit board having an end with an enclosure support area formed therein, the enclosure support area having opposite sides and a rear end. The assembly also includes an optical transmitter and an optical receiver operably disposed on the circuit board adjacent the enclosure support area rear end and respectively configured to transmit and receive respective transmit and receive optical signals. The assembly also has a receptacle having a receptacle central enclosure that has sides configured to slidingly engage the sides of the enclosure support area to mate the receptacle central enclosure with the circuit board. The receptacle central enclosure has upper and lower flanges for connecting to upper and lower portions of the electronic device housing. The receptacle central enclosure has a receptacle aperture with at least one transverse dimension of between about 2 mm and 4 mm.

Additional features and advantages will be set forth in the detailed description which follows, and in part will be readily apparent to those skilled in the art from that description or recognized by practicing the same as described herein, including the detailed description that follows, the claims, as well as the appended drawings.

It is to be understood that both the foregoing general description and the following detailed description present embodiments that are intended to provide an overview or framework for understanding the nature and character of the claims. The accompanying drawings are included to provide a further understanding of the disclosure, and are incorporated into and constitute a part of this specification. The drawings illustrate various embodiments and together with the description serve to explain the principles and operation.

DETAILED DESCRIPTION

Reference is now made in detail to example embodiments of the disclosure, examples of which are illustrated in the accompanying drawings. Whenever possible, like reference numbers or symbols are used to refer to like components or parts.

In the description below, the term electronic device includes a device that has optical transmission and receiving capability via a fiber optic interface assembly that includes a fiber optic interface device such as a receptacle, and that has electrical, optical or both electrical and optical functionality as enabled at least in part by electronic, optical or a combination of optical and electronic components.

Cartesian coordinates are provided in some of the Figures to provide a reference frame for different views.

Electronic Device System

Figure 1:
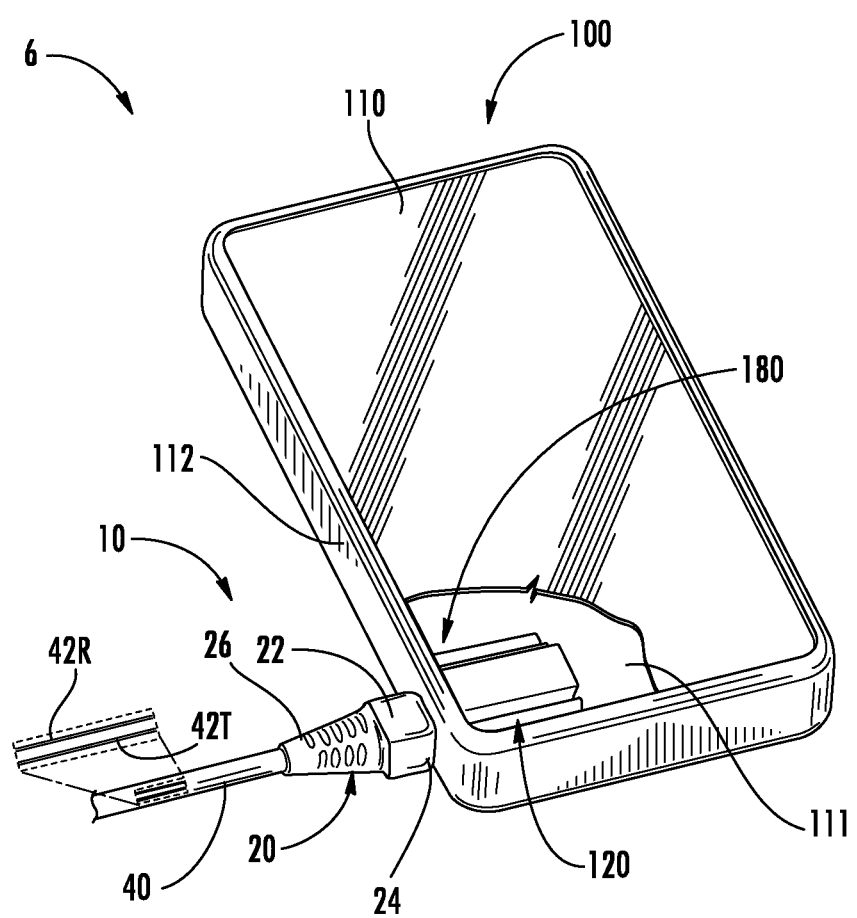
FIG. 1 is an elevated view of an example electronic device system that includes a relatively small electronic device and a fiber optic cable assembly operably connected thereto.
Figure 2:
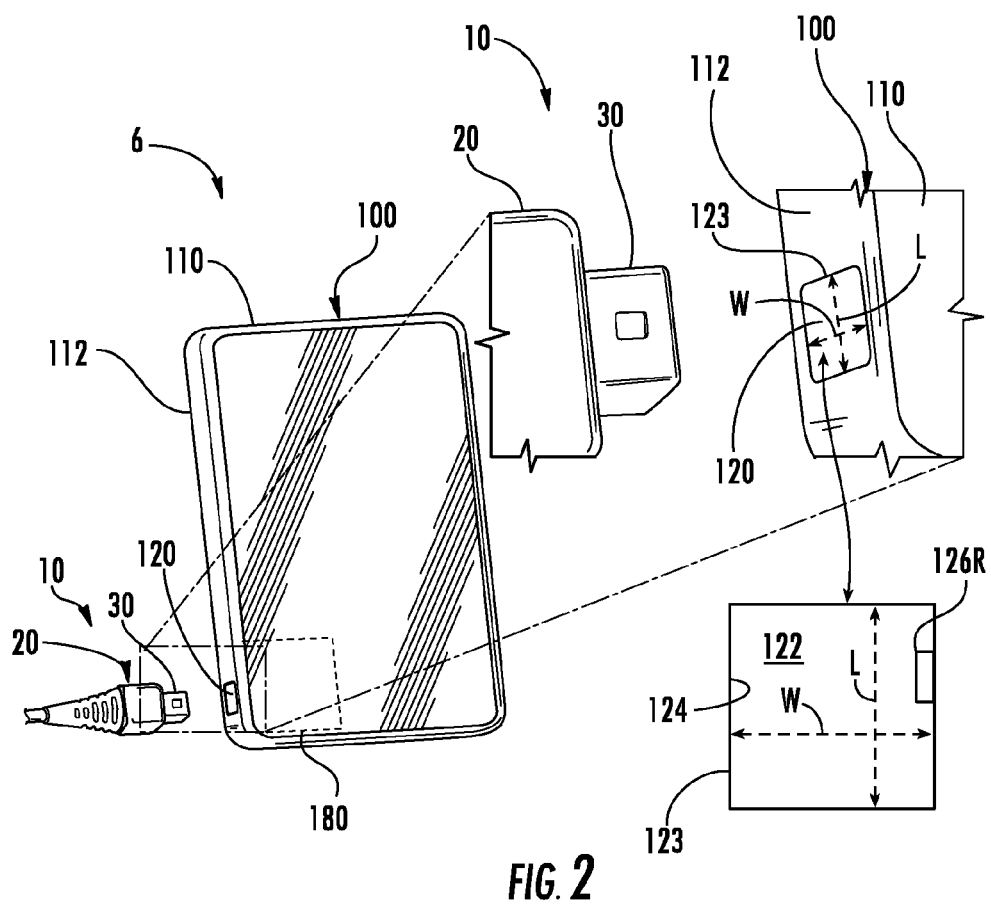
FIG. 2 is similar to FIG. 1 and shows the fiber optic cable assembly disconnected from the electronic device.

FIG. 1 is an elevated isometric view of an example electronic device system 6 that includes a relatively small (e.g., hand-held) electronic device ("device") 100, and an external fiber optic cable assembly 10 operably connected thereto. FIG. 2 is similar to FIG. 1 and shows external fiber optic cable assembly 10 disconnected from device 100. Fiber optic cable assembly 10 includes a fiber optic interface device 20 operably connected to a fiber optic cable 40. As fiber optic interface device 20 is in the form of a plug, it is referred to hereinbelow as plug 20 as a shorthand way of distinguishing between other fiber optic interface devices discussed below.

Device 100 has a device enclosure 110 with an interior 111 and a side 112 where fiber optic cable assembly 10 is operably connected at a fiber optic interface assembly 180, which is described in greater detail below. The fiber optic interface assembly 180 includes an optical fiber interface device 120 located at device enclosure side 112 and configured to matingly receive and engage plug 20. Thus, optical fiber interface device 120 is referred to below as receptacle 120.

Receptacle 120 of fiber optic interface assembly 180 is intended to have a small form factor to make it suitable for small electronic devices 100. Receptacle 120 includes an interior 122 with an aperture 123. Receptacle interior 122 is defined by inner side walls 124 and an inner rear wall 125. In an example, at least one of inner side walls 124 includes a receptacle keying feature 126R. Receptacle 120 is shown in the close-up inset of FIG. 2 with aperture 123 having a lengthwise dimension L in the long direction of device 100 and a width dimension W in the short direction of the device.

The form factor of receptacle 120 is defined by dimensions L and W. Example values for length dimension L that define a small form factor can be from about 2 mm to about 15 mm, and example widths W that define a small form factor can be from about 2 mm to about 4 mm. An example square small-form-factor receptacle 120 has aperture dimensions about 2 mm×2 mm, while an example rectangular receptacle 120 has small-form-factor dimensions (W×L) of 2 mm×13 mm. In an example, a small-form-factor receptacle 120 has a transverse dimension (L or W) of between about 2 mm and 4 mm. A square receptacle aperture 123 is shown in the pertinent Figures and discussed below by way of illustration.

Receptacle 120 is described herein as having a receptacle function for the sake of illustration. In other examples, receptacle 120 can be configured to have a plug function and the plug 20 can be configured as a receptacle.

Plug

Figure 3A:
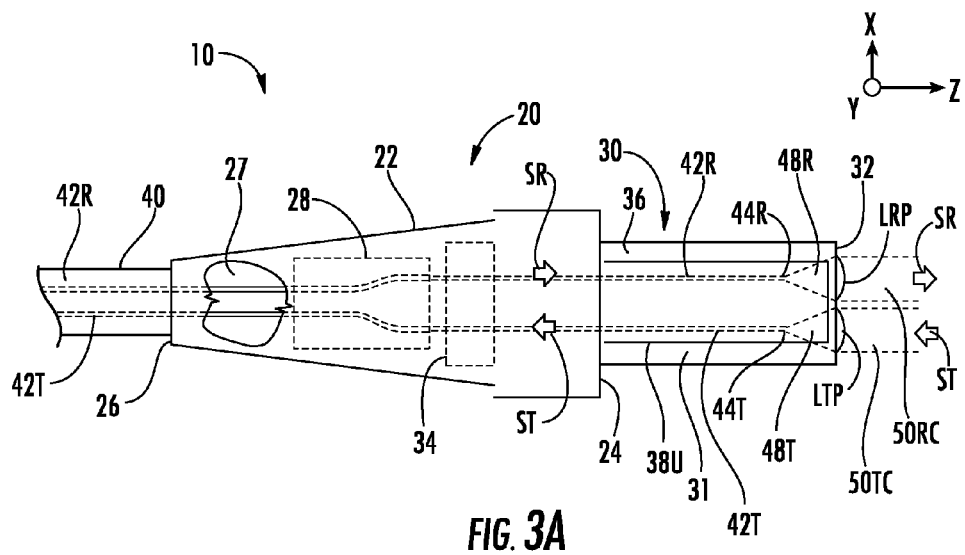
FIG. 3A is a close-up top-down view of the plug end of the example fiber optic cable assembly.

FIG. 3A is a close-up, top-down view of the plug end of an example fiber optic cable assembly 10. Plug 20 includes a plug housing 22 with a front end 24, a rear end 26 and an interior 27 that contains an optional optical fiber guide 28. Optical fiber guide 28 is configured to support and guide a pair of optical fibers 42T and 42R within plug 20, and can be in the form of a unitary member or can be an assembly comprising a number of different parts. In other embodiments of plug 20, plug housing 22 is formed by overmolding and does not require the use of optical fiber guide 28.

Plug 20 also includes a plug ferrule 30 having a ferrule body 31 with a front end 32 and a rear end 34. In an example, plug ferrule body 31 has an upper surface 36U that supports at least a portion of an upper electrical contact 38U and a lower surface 36L that supports at least a portion of a lower electrical contact 38L (see FIG. 3C). Plug ferrule 30 is connected at ferrule body rear end 34 to plug housing front end 24. Fiber optic cable 40 is operably connected to plug 20 at plug housing rear end 26. Fiber optic cable 40 supports at least a transmit optical fiber 42T and a receive optical fiber 42R, which are supported and guided within plug housing interior 27 by the aforementioned optional optical fiber guide 28. Plug ferrule 30 has a cross-sectional shape that corresponds to the shape of receptacle aperture 123 so that the plug ferrule can mate with receptacle 120.

Transmit and received optical fibers 42T and 42R run from the fiber optic cable 40 to plug housing interior 27, where they are supported by optical fiber guide 28. Transmit and received optical fibers 42T and 42R then run to plug ferrule 30, where they are supported by plug ferrule body 31 in respective transmit and receive optical pathways 39T and 39R (e.g., bores) formed therein (see FIG. 3B, introduced and discussed below). Transmit and receive optical fibers 42T and 42R terminate at respective optical fiber ends 44T and 44R within plug ferrule body 31. Transmit and receive fibers 42T and 42R carry transmit and receive optical signals ST and SR.

Figure 3B:
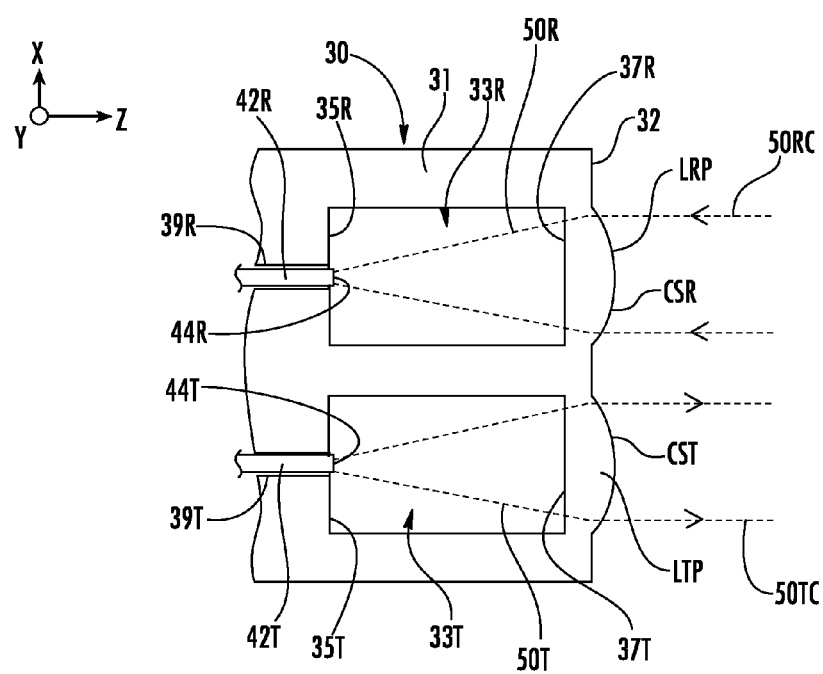
FIG. 3B is a close-up view of the ferrule of the plug, illustrating an example ferrule configuration that includes gaps within the ferrule body.
Figure 3C:
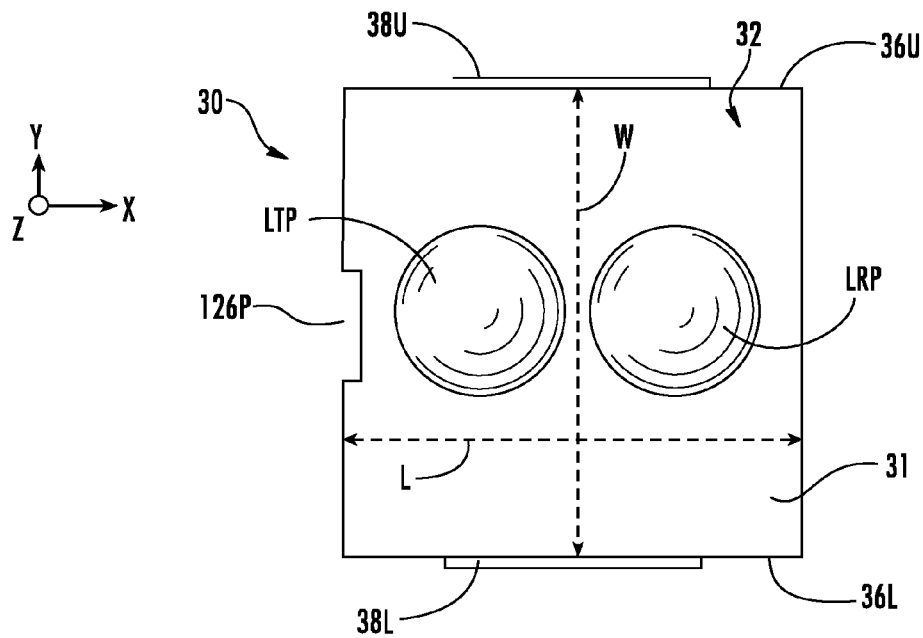
FIG. 3C is a front-on view of the ferrule of FIGS. 3A and 3B.

FIG. 3B is a close-up, cross-sectional view in the Y-Z plane of an example end configuration for plug ferrule 30 at ferrule body front end 32. FIG. 3C is a front-on view of plug ferrule 30, and illustrates an example where the ferrule includes a plug keying feature 126P configured to engage with a receptacle keying feature 126R (see FIG. 2). Plug ferrule 30 includes optical pathways 39T and 39R that respectively terminate at transmit and receive gaps 33T and 33R formed in plug ferrule body 31 adjacent ferrule body front end 32. Transmit and receive gaps 33T and 33R are aligned with transmit and received fibers 42T and 42R.

In an example, transmit and receive gaps 33T and 33R can be merged to form a single gap, and two separate gaps are shown by way of illustration. Transmit and receive gaps 33T and 33R are defined in part by respective gap back walls 35T, 35R and respective gap front walls 37T, 37R. Transmit and receive optical fiber ends 44T and 44R are respectively arranged at or adjacent back walls 35T and 35R, i.e., at or adjacent respective ends of transmit and receive optical pathways 39T and 39R. In an example embodiment, transmit and receive optical fiber ends 44T and 44R can extend beyond respective back walls 35T and 35R and into respective transmit and receive gaps 33T and 33R.

Plug ferrule body front end 32 includes transmit and receive convex surfaces CST and CSR that, together with gap front walls 37T and 37R, respectively define plug transmit and plug receive lenses LTP and LRP. In the discussion below and in the relevant Figures, transmit and receive plug lenses LTP and LRP are sometimes identified by the aforementioned transmit and receive convex surfaces CST and CSR for ease of illustration and discussion.

Plug transmit and receive lenses LTP and LRP are arranged spaced apart from and in line with transmit and receive optical fiber ends 44T and 44R residing within plug ferrule 30. In an example, convex surfaces CST and CSR are aspherical. In an example, plug transmit and receive lenses LTP and LRP each have a focal length FP, and transmit and receive optical fiber ends 44T and 44R are arranged at a distance of about one focal length FP away from the transmit and receive lenses. Generally, plug transmit and receive lenses LTP and LRP are arranged at an operable distance from respective transmit and receive optical fiber ends 44T and 44R, wherein the operable distance is such that transmit and receive light 50T and 50R is either effectively focused or collimated, depending on the direction of light travel.

The embodiment of plug ferrule 31 having transmit and receive gaps 33T and 33R (or a single merged gap) allows for gap front walls 37T and 37R to be a refracting surface since the adjacent medium within the gaps can be air, fluid, etc., with a refractive index different from the material making up plug ferrule body 31. Moreover, front walls 37T and 37R represent an extra degree of freedom in the optical design of plug transmit and receive lenses LTP and LRP, i.e., these walls need not be planar as shown but can be curved to contribute to the optical performance of the transmit and receive lenses.

Figure 3D:
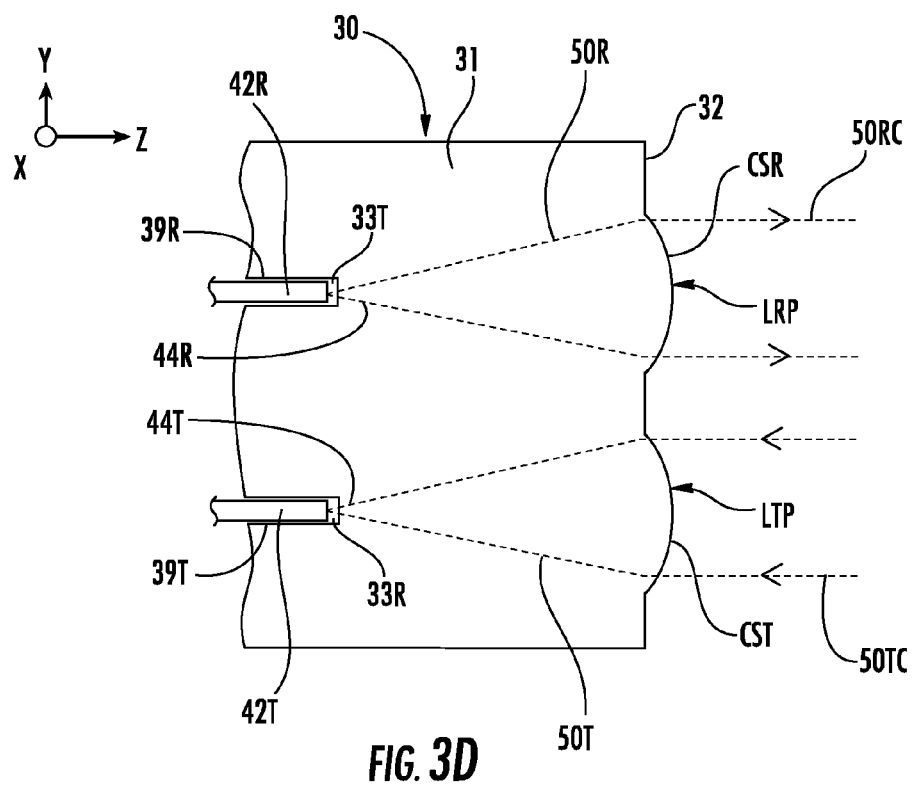
FIG. 3D is similar to FIG. 3B and illustrates an example where the ferrule body has no substantial gaps between the transmit and receive optical fiber ends and the plug lens elements.

FIG. 3D represents another example embodiment where there are no substantial transmit and receive gaps 33T and 33R. In this example, single lens surfaces CST and CSR define plug transmit and receive lenses LTP and LRP. Also in an example, optical fiber ends 44T and 44R of transmit and receive optical fibers 42T and 42R are slightly recessed within their respective optical pathways 39T and 39R to avoid being damaged. The resulting spaces represent small transmit and receive gaps 33T and 33R, but the proximity of the corresponding gap front walls 37T and 37R to optical fiber ends 44T and 44R requires that substantially all of the optical power reside at transmit and receive lens surfaces CST and CSR.

With continuing reference to FIG. 3A through FIG. 3D, in the operation of optical fiber cable assembly 10, light 50R ("receive light") traveling in receive optical fiber 42R towards its optical fiber end 44R diverges as it exits the optical fiber end. This divergent receive light 50R travels to plug receive lens LRP, either through receive gap 33R or through the corresponding portion of plug ferrule body 31. Plug receive lens LRP collimates divergent receive light 50R to form collimated receive light 50RC.

Likewise, collimated transmit light 50TC transmitted by device 100 (as described below) is received by plug transmit lens LTP, which focuses the collimated transmit light (either through transmit gap 33T or through the corresponding portion of plug ferrule body 31) onto optical fiber end 44T, thereby causing transmit light 50T to travel down transmit optical fiber 42T.

Note that plug transmit and receive light 50T and 50R travels through plug ferrule body 31. Plug ferrule body 31 is thus made of a substantially transparent material at the wavelength of plug transmit and receive light 50T and 50R, which wavelength can be in the range from 850 nm to 1550 nm. Example materials for plug ferrule body 31 include transparent resin, such as unfilled Polyetherimide (PEI), sold by the General Electric Company under the trademarked name ULTEM® 1010.

In an example, the form factor of plug 20 is defined by transverse dimensions L' and W' of plug ferrule 30, as illustrated in FIG. 3C. Example values for length dimension L' that define a small form factor can be from about 2 mm to about 15 mm and example widths W' that define a small form factor can be from about 2 mm to about 4 mm. An example square small-form-factor plug 20 has a plug ferrule 30 with transverse dimensions about 2 mm×2 mm, while an example rectangular plug 20 has small-form-factor dimensions (W'× L') of 2 mm×13 mm. In an example, a small-form-factor plug 20 has a transverse dimension (L' or W') of between about 2 mm and 4 mm. A square cross-sectioned plug ferrule 30 is shown in the pertinent Figures by way of illustration.

Integrated Optical Engine

Figure 4:
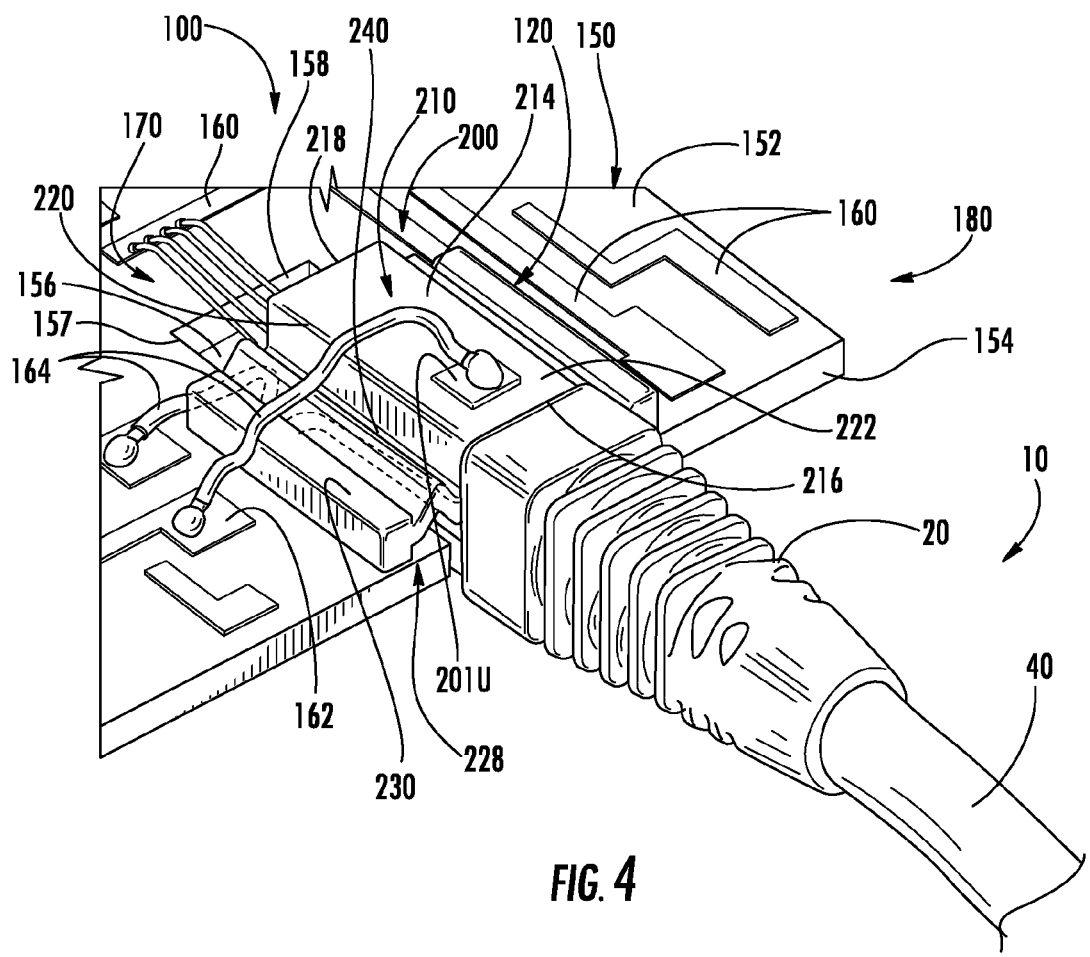
FIG. 4 and FIG. 5 are front and rear elevated views of an example fiber optic cable assembly operably connected to an integrated optical engine, with the integrated optical engine being attached to a circuit board with the electronic device.
Figure 5:
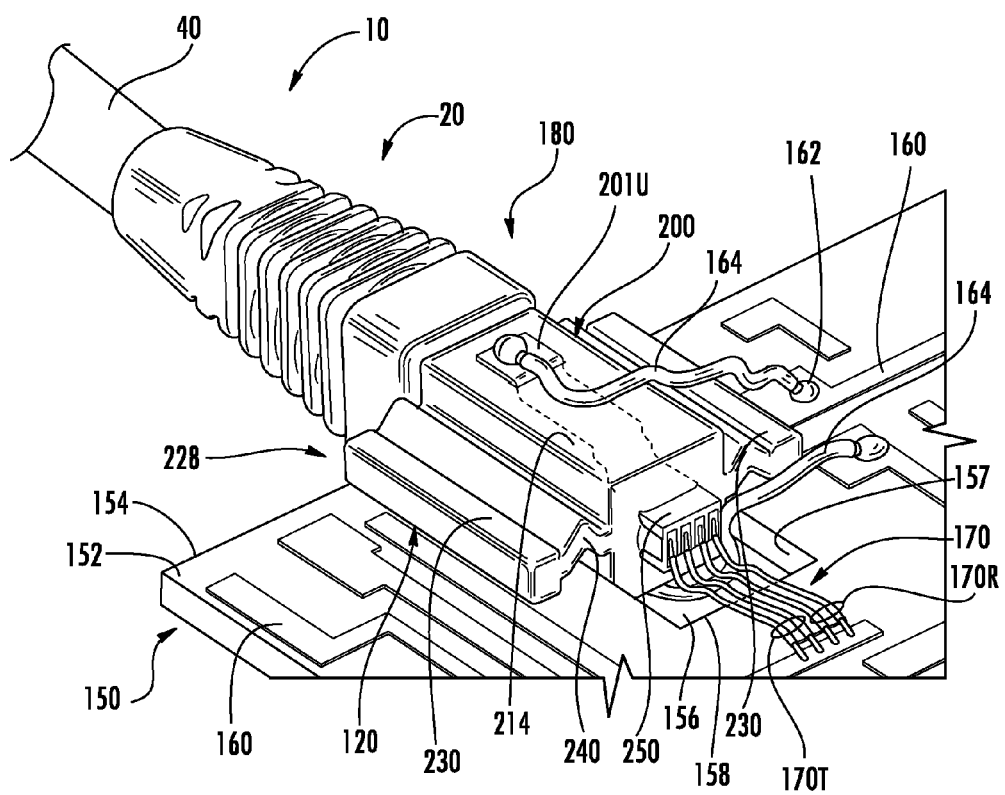
Figure 6:
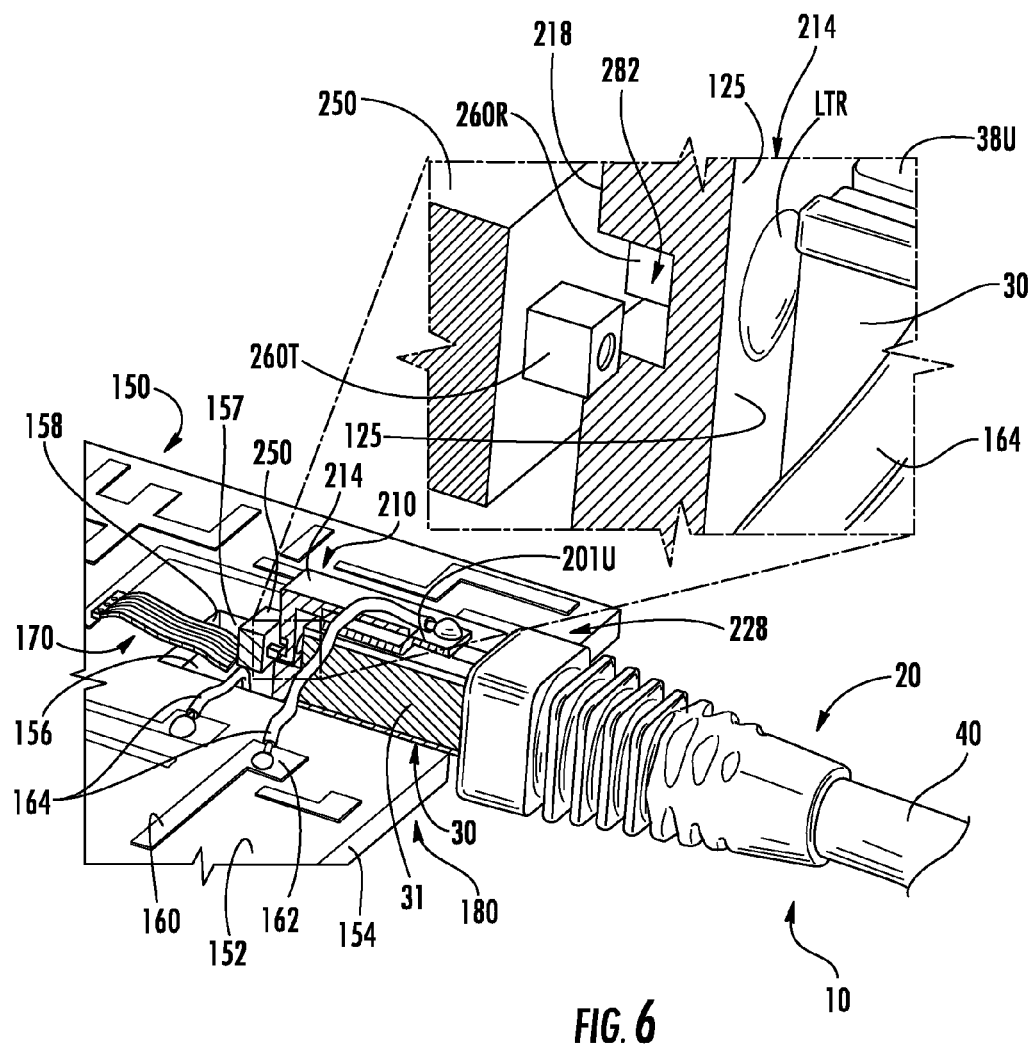
FIG. 6 is a partial cut-away close-up view similar to FIG. 4, showing the internal structure of the integrated optical engine and plug ferrule.

FIG. 4 and FIG. 5 are front and rear elevated views of fiber optic cable assembly 10 operably connected to fiber optic interface assembly 180 of device 100, but with device enclosure 110 removed to more clearly show the components of the fiber optic interface assembly. The example fiber optic interface assembly 180 includes an integrated optical engine 200 with receptacle 120 integrally formed therewith. FIG. 6 is a partial cut-away close-up view similar to FIG. 4, showing the internal structure of fiber optic interface assembly 180. Integrated optical engine 200 is attached to a circuit board 150 of electronic device 100. Circuit board 150 includes an upper surface 152 and a front end 154. Circuit board 150 includes an enclosure support area 156 that is selected from one of a slot, recess, offset, aperture, and relief zone, so that an enclosure 214 further described below, is aligned with or is recessed slightly with respect to the printed circuit board. For purposes of illustration, an embodiment employing a slot 156 at circuit board front end 154 is further described. Circuit board slot 156 has sides 157 and a rear end 158 defined by circuit board 150. Circuit board slot 156 is configured to accommodate a portion of integrated optical engine 200, as described in greater detail below.

Integrated optical engine 200 includes a housing 210 with a central enclosure 214. Central enclosure 214 defines the aforementioned receptacle 120 and receptacle aperture 123. Central enclosure 214 has a front end 216, a rear end 218, sides 220 and an upper surface 222. Central enclosure 214 thus defines the size and shape of receptacle 120.

Figure 7:
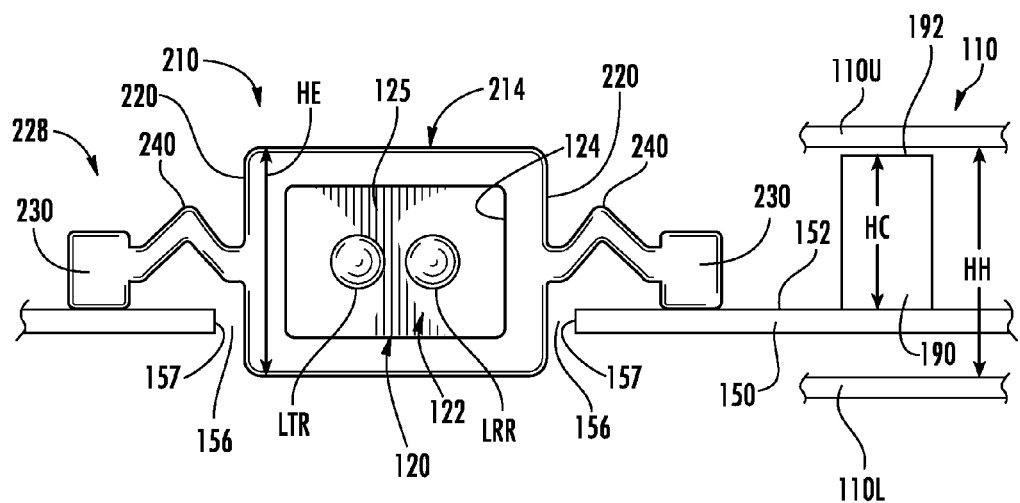
FIG. 7 is a close-up, front-end view of the housing of the integrated optical engine and illustrating an example flexible mount used to mount the integrated optical engine to the circuit board.

Integrated optical engine housing 210 is supported by circuit board 150 via a flexible mount 228. FIG. 7 is a close-up, front-end view of integrated optical engine housing 210 illustrating an example flexible mount 228. Example flexible mount 228 includes two outboard support members 230 connected to sides 220 of central enclosure 214 by respective flexible members 240. Outboard support members 230 are supported by circuit board upper surface 152 so that central enclosure 214 floats within circuit board slot 156. As described in greater detail below, this configuration serves to redirect and attenuate forces applied to receptacle 120 of central enclosure 214 during the mating and unmating operations with plug 20.

FIG. 7 also shows upper and lower sections 110U and 110L of electronic device housing 110 spaced apart by a height HH. The configuration where receptacle 120 resides at least in part within enclosure support area 156 of circuit board 150 rather than merely atop the circuit board allows for the receptacle to make the full use of the limited height HH available within electronic device housing 110. In an example, about half of central enclosure 214 resides above the plane of circuit board 150 and half resides below the plane. Central enclosure 214 has a height HE.

FIG. 7 also shows a component 190 operably supported by circuit board 150 on circuit board upper surface 152. Component 190 may be for example a processor or other type of microcircuit chip. Component 190 has a top 192 and a height HC as measured from circuit board upper surface 152 to component top 192. In an example, height HC represents the greatest height of all the components operably supported by the circuit board. In an example, central enclosure height HE is greater than height HC of component 190, i.e., HE>HC. Also in an example, HH>HE>HC.

With reference again to FIG. 4 through FIG. 6, upper surface 152 of circuit board 150 includes electrically conducting lines 160, some of which have contact pads 162. Power-conducting wires 164 are electrically contacted to select contact pads 162 and to integrated optical engine 200 at respective upper and lower electrical contacts 201U and 201L disposed at least partially within receptacle interior 122 (see also FIG. 8). Power-conducting wires 164 are used to provide electrical power to integrated optical engine 200.

Circuit board 150 also includes signal-conducting wires 170 for carrying signals to and from integrated optical engine 200, and in particular to and from a transmitter-receiver module 250 that includes an optical transmitter 260T and an optical receiver 260R (FIG. 6). Signal-conducting wires 170 include a transmit signal wire 170T that carries transmit signals ST to optical transmitter 260T from a transmit component (not shown) on circuit board 150, and a receive signal wire 170R that carries receive signals SR to a receive component (not shown) on the circuit board (see FIG. 5).

In an example, optical transmitter 260T includes a vertical-cavity surface-emitting laser (VCSEL) and optical receiver 260R includes a PIN photodiode. In an example, transmitter-receiver module 250 includes a transmitter optical sub-assembly (TOSA) and a receiver optical sub-assembly (ROSA).

With reference to FIG. 6, central enclosure 214 includes in rear end 218 a cut-out 282 that accommodates optical transmitter 260T and optical receiver 260R, which places the optical transmitter and optical receiver within inner rear wall 125 of receptacle 120. Inner rear wall 125 includes respective receptacle transmit and receive lenses LTR and LRR (LTR not shown in FIG. 6; see FIG. 9) that are respectively aligned optical transmitter 260T and optical receiver 260R.

In an example embodiment such as shown in FIG. 5, optical transmitter 260T and optical receiver 260R are arranged immediately adjacent central enclosure rear end 218. Central enclosure 214 is thus made of a material (e.g., the aforementioned Ultem® transparent resin) that is substantially transparent to plug transmit light 50T emitted by optical transmitter 260T and receive light 50R received by optical receiver 260R.

In an example, receptacle transmit and receive lenses LTR and LRR each have a focal length FR, and optical transmitter 260T and optical receiver 260R are arranged at a distance of about one focal length FR away from the transmit and receive lenses. Generally, receptacle transmit and receive lenses LTR and LRR are respectively arranged at operable distances from optical transmitter 260T and optical receiver 260R, wherein the operable distance is such that transmit and receive light is either effectively focused or collimated, depending on the direction of light travel.

Figure 8:
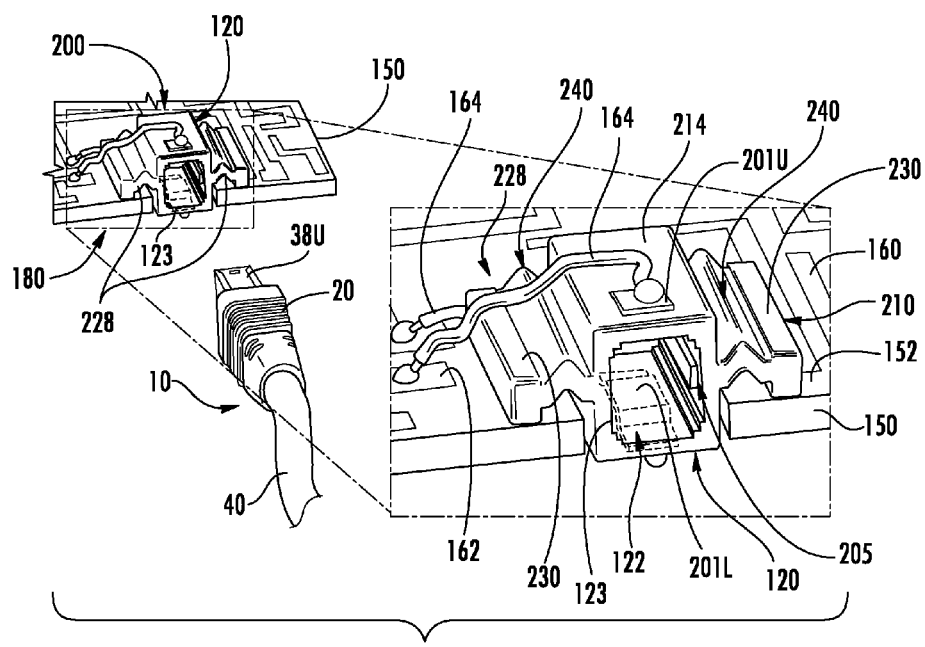
FIG. 8 is a front elevated view of the fiber optic cable assembly in front of the fiber optic interface assembly, and includes a close-up view of the integrated optical engine supported by the circuit board.
Figure 9:
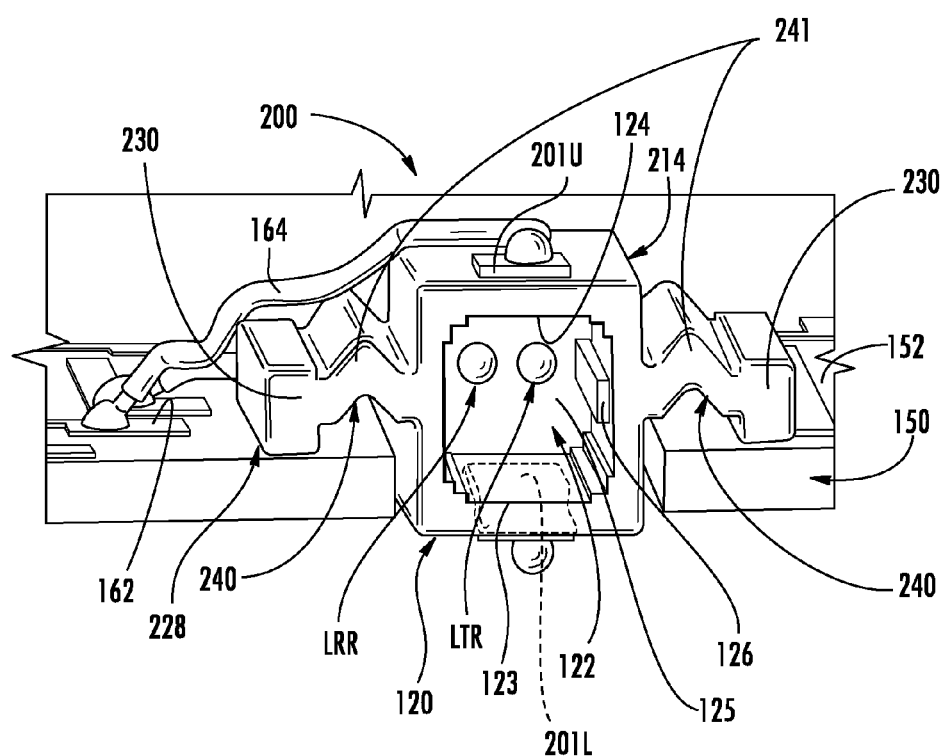
FIG. 9 is similar to the close-up inset view of FIG. 8 but is more from the forward direction and shows the receptacle transmit and receive lenses.

FIG. 8 is a front elevated view of fiber optic cable assembly 10 in front of fiber optic interface assembly 180, and includes a close-up view of integrated optical engine 200 supported by circuit board 150. FIG. 9 is similar to the close-up inset view of FIG. 8, but is more from the forward direction, and shows receptacle transmit and receive lenses LTR and LRR.

In an example, fiber optic interface assembly 180 is formed with integrated optical engine 200, and receptacle 120 formed as an integrated monolithic structure, as opposed to having the receptacle separated from the integrated optical engine. This kind of integrated configuration could lead to mating and unmating forces causing optical misalignments. The optical misalignments can occur between optical transmitter 260T of integrated optical engine 200 and transmit optical fiber 42T of fiber optic cable assembly 10, and between optical receiver 260R of the integrated optical engine and receive optical fiber 42R of the fiber optic cable assembly. Such misalignment can adversely impact the performance of fiber optic interface assembly 180 with respect to the transmission and reception of optical information between external optical fiber cable assembly 10 and device 100.

The configuration of integrated optical engine 200 and receptacle 120 disclosed herein avoids the aforementioned potential optical misalignment issues on fiber optic interface assembly 180 by flexibly supporting central enclosure 214 in circuit board slot 156 so that it floats therein. When mating and unmating plug 20 at receptacle 120, the attendant forces are redirected to the circuit board 150 through the outboard support members 230 via flexible members 240.

Moreover, flexible members 240 of flexible mount 228 are configured to flex in response to the applied forces, thereby at least partially attenuating the applied forces. Power-conducting wires 164 and signal-conducting wires 170 are preferably provided with some slack to accommodate movement of central enclosure 214 within circuit board slot 156 so that no substantial resistance force is presented to the central enclosure by these wires.

An example configuration for flexible members 240 for flexible mount 228 includes one or more corrugations 241 designed to permit the flexing of the flexible members when subjected to the kind of forces associated with mating and unmating of optical fiber connectors. A single corrugation 241 is shown in the relevant Figures by way of illustration. Other configurations for flexible members 240 can be employed, such as thin flexures, resilient members such as springs, flexible materials such as dense foam, rubber, etc.

In an example, central enclosure 214, flexible members 240 and outboard members 230 are formed as a monolithic structure, e.g., are molded or milled from a single body. In another example, integrated optical engine central enclosure 214 and flexible mount 228 (e.g., flexible members 240 and outboard members 230) are assembled from different parts. Example materials for integrated optical engine central enclosure 214, flexible members 240 and outboard members 230 include plastic and a thermoplastic material.

Thus, in one example, fiber optic interface assembly 180 is flexibly mounted to circuit board 150 and within electronic device enclosure 110 so that receptacle 120 is accessible, for example, at device enclosure side 112. The arrangement of central enclosure 214 within circuit board slot 156 conserves space within electronic device enclosure 110, which is another important attribute for small electronic devices 100.

Optical Engine with Optical Transmitter and Optical Receiver on Circuit Board

Figure 10A:
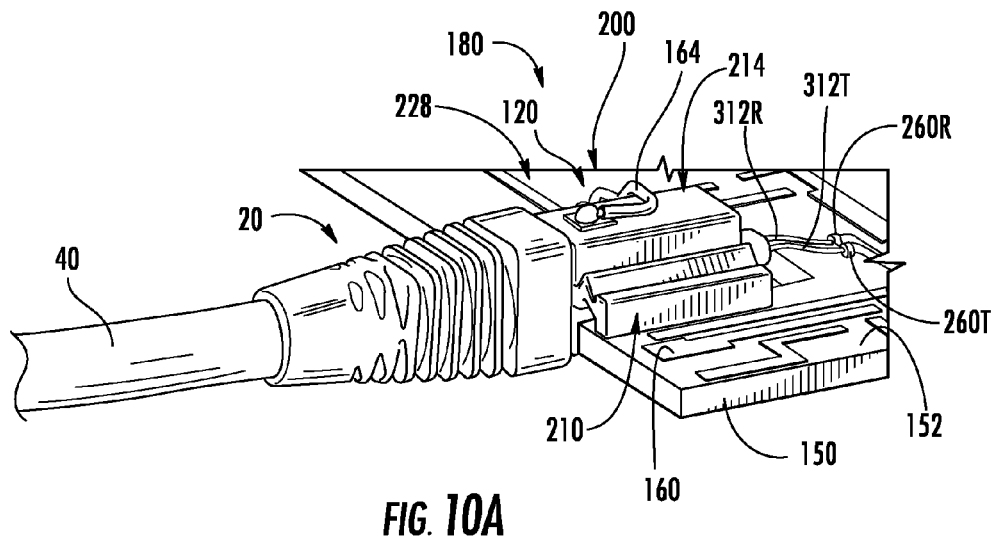
FIG. 10A and FIG. 10B are front and rear elevated views of an example fiber optic cable assembly operably connected to an integrated optical engine at its connector interface.
Figure 10B:
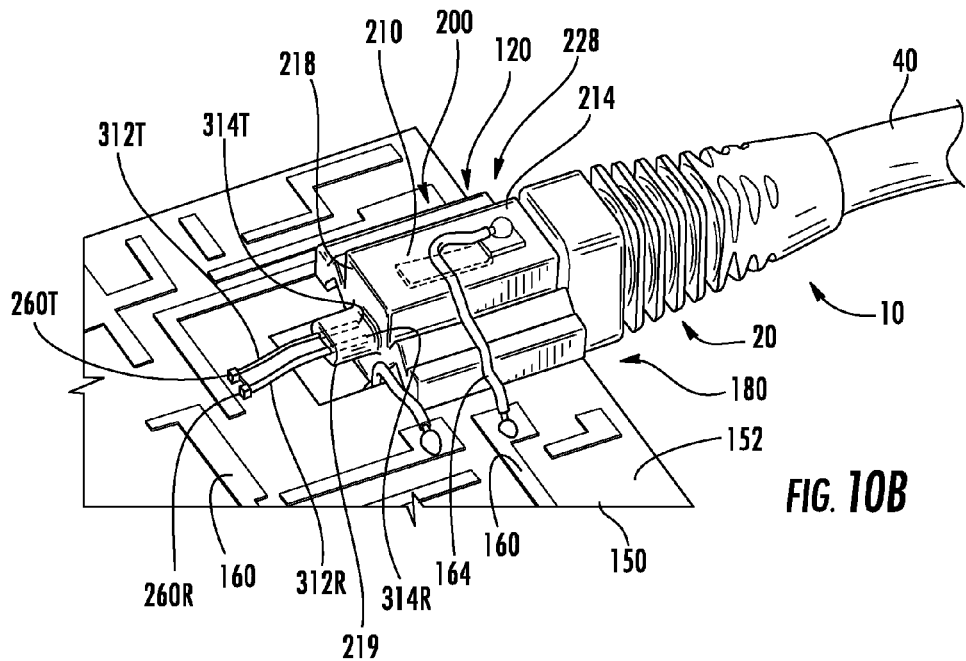
Figure 10C:
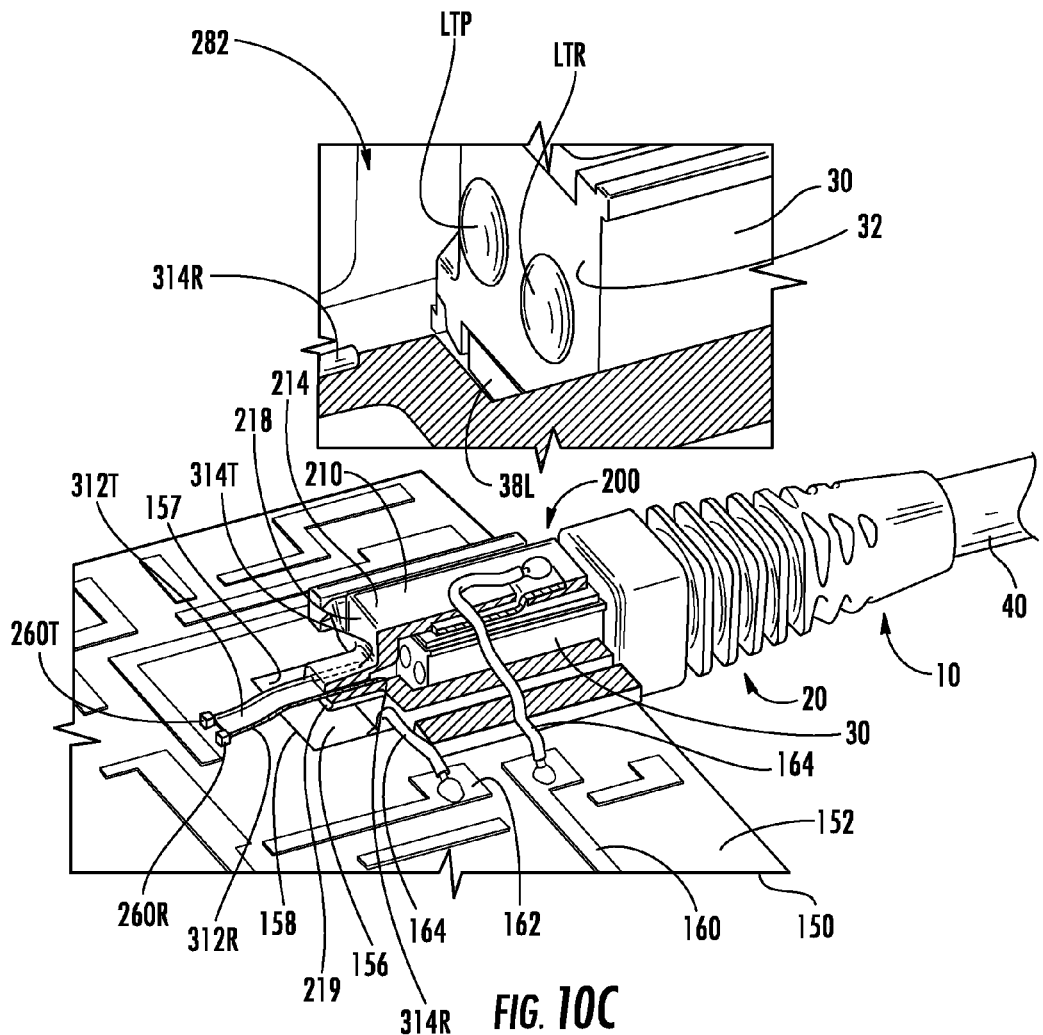
FIG. 10C is similar to FIG. 10B and is a close-up partial cut-away view that illustrates the internal configuration of the central enclosure of the integrated optical engine and the plug ferrule.

FIG. 10A and FIG. 10B are front and rear elevated views of an example fiber optic cable assembly 10 operably connected to fiber optic interface assembly 180 at receptacle 120, wherein optical transmitter 260T and optical receiver 260R reside on circuit board 150. FIG. 10C is similar to FIG. 10B and is a close-up, partial cut-away view that illustrates the internal configuration of integrated optical engine central enclosure 214 and plug ferrule 30 of the example fiber optic interface assembly 180.

Optical transmitter 260T and optical receiver 260R reside on circuit board upper surface 152 and are optically connected to central enclosure 214 via respective transmit and receive light guides 312T and 312R, which in an example are respective transmit and receive optical fibers. Central enclosure 214 includes a lead-in channel 219 at rear end 218 where transmit and receive light guides 312T and 312R lead into receptacle interior 122, where these light guides terminate at respective light guide ends 314T and 314R. Light guide ends 314T and 314R are spaced apart from and aligned with plug transmit and receive lenses LTP and LRP when plug 20 is mated with receptacle 120. Transmit and receive light guides 312T and 312R preferably include some slack to accommodate movement of central enclosure 214 within circuit board slot 156 due to the flexing of flexible members 240.

Fiber Optic Interface Assembly with Structural Rigidity

Figure 11A:
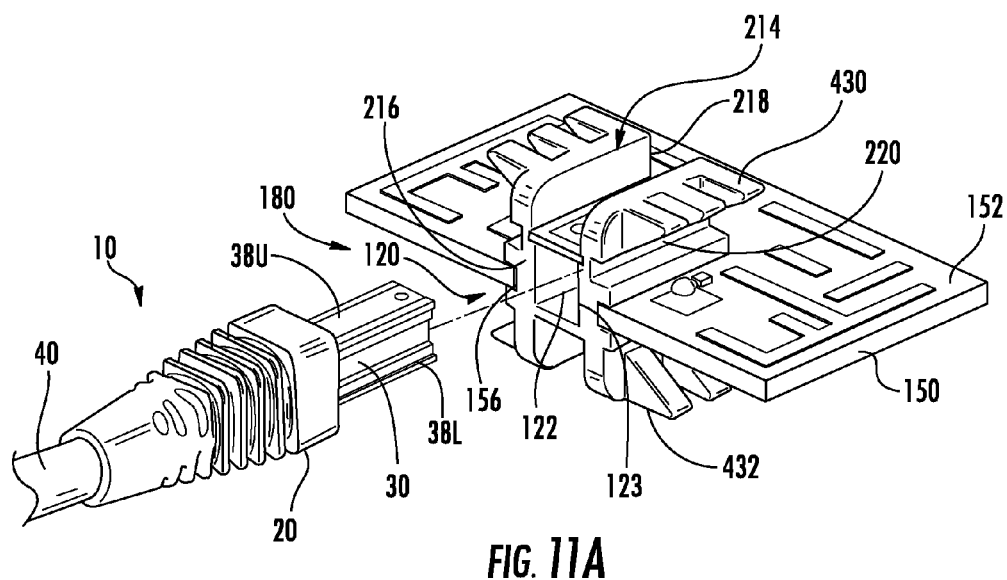
FIG. 11A and FIG. 11B are front and rear elevated views of an example fiber optic interface assembly supported by the circuit board, with the fiber optic cable shown in front of the receptacle aperture.
Figure 11B:
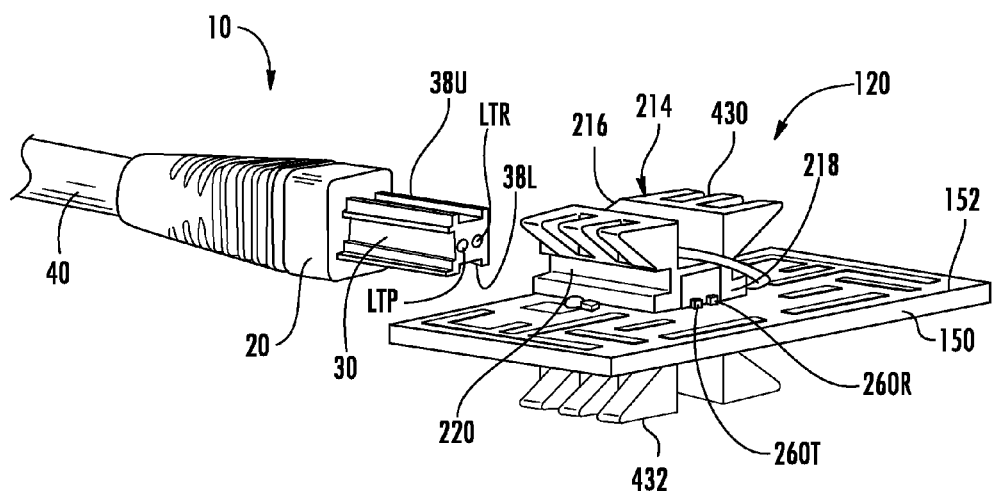
Figure 11C:
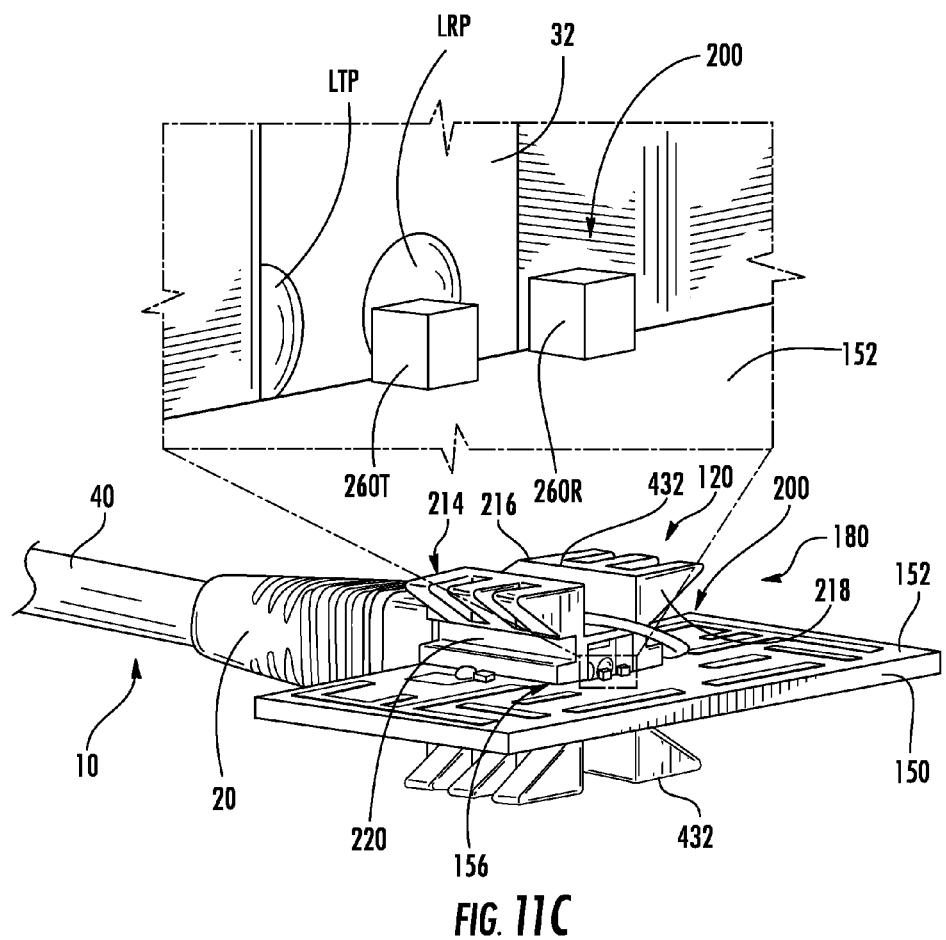
FIG. 11C is similar to FIG. 11B and shows the fiber optic cable assembly connected to the receptacle of the fiber optic interface assembly.

FIG. 11A and FIG. 11B are front and rear elevated views of an example fiber optic interface assembly 180 supported by circuit board 150, with fiber optic cable assembly 10 shown in front of receptacle aperture 123. FIG. 11C is similar to FIG. 11B and shows fiber optic cable assembly 10 connected to receptacle 120.

Figure 12:
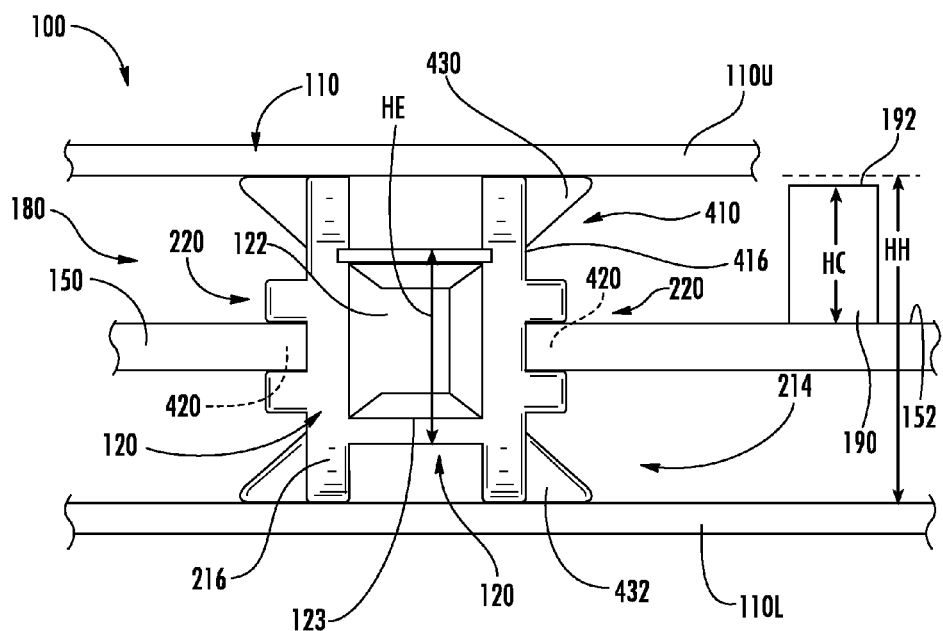
FIG. 12 is a front-on, close-up view of the fiber optic interface assembly with a receptacle central enclosure mounted within the device housing.

An example of fiber optic interface assembly 180 includes a unitary central enclosure 214 that defines receptacle 120. FIG. 12 is a front-on, close-up view of fiber optic interface assembly 180 with central enclosure 214 mounted within device enclosure 110. Central enclosure 214 includes a front end 216, a rear end 218 and sides 220. In an example, central enclosure sides 220 include grooves 420 that engage sides 157 of slot 156 formed in circuit board 150. The engagement is accomplished in tongue-and-groove fashion when enclosure central enclosure 214 is inserted into circuit board slot 156.

Central enclosure 214 also includes top and bottom flanges 430 and 432 configured for mounting the central enclosure to device enclosure 110 of device 100, as illustrated in front-on view of FIG. 11C. Such mounting provides fiber optic interface assembly 180 with mechanical strength so that the mating and unmating forces associated with plug 20 and receptacle 120 cannot substantially alter the optical alignment between optical transmitter 260T and optical receiver 260R of the fiber optic interface assembly 180 and the transmit and receive optical fibers 42T and 42R of plug 20 (see FIG. 3A). In an example, top and bottom flanges 430 and 432 can be bonded to device enclosure 110 using epoxy or solder to fix central enclosure 214 within device enclosure 110.

FIG. 12 is similar to FIG. 7 in that is also shows upper and lower sections 110U and 110L of electronic device housing 110 spaced apart by a height HH. The configuration where central enclosure 214 resides in part within an enclosure support area 156 of circuit board 150 rather than atop the circuit board allows for the associated receptacle 120 to make the full use of the limited height HH available within electronic device housing 110. In an example, about half of enclosure 214 resides above the plane of circuit board 150 and half resides below the plane. In an example, central enclosure 214 has a height HE.

FIG. 12 also shows component 190 operably supported by circuit board 150 on circuit board upper surface 152. As discussed above in connection with FIG. 7, component 190 may be for example a processor or other type of microcircuit chip. Component 190 has a top 192 and a height HC as measured from circuit board upper surface 152 to component top 192. In an example, height HC represents the greatest height of all the components operably supported by the circuit board. In an example, central enclosure height HE is greater than height HC of component 190, i.e., HE>HC. Also in an example, HH>HE>HC.

Figure 13A:
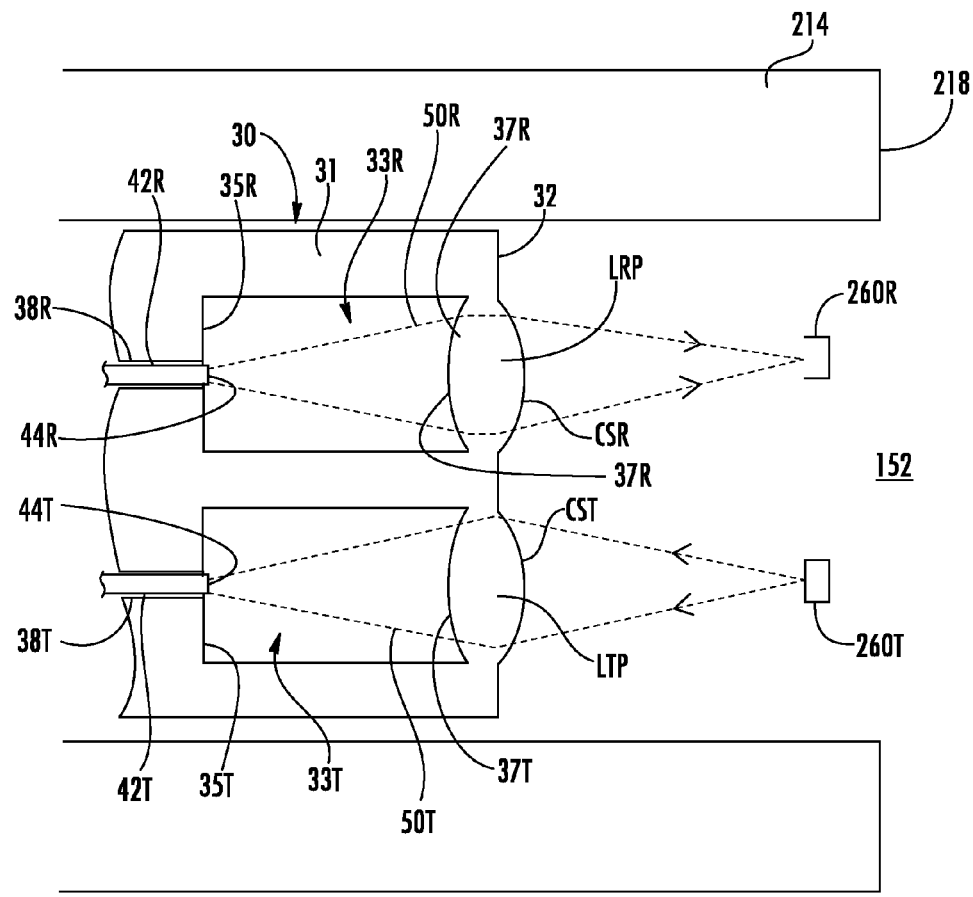
FIG. 13A is a top-down cross-sectional view of the mated plug and receptacle of the O-E connector FIG. 11A through FIG. 11C and FIG. 12.
Figure 13B:
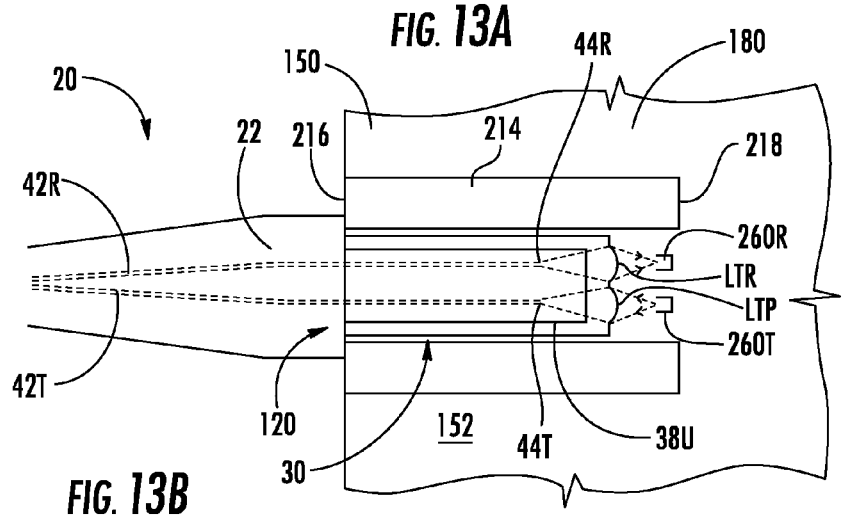
FIG. 13B is a top-down cross-sectional view similar to FIG. 13A but from farther away to show more of the plug and plug ferrule.

With reference again also to FIG. 11C, fiber optic interface assembly 180 has an integrated optical engine 200 that includes optical transmitter 260T and optical receiver 260R operably mounted to circuit board 150 adjacent central enclosure rear end 218. In an example, interior 122 of receptacle 120 is open at central enclosure rear end 218 so that plug ferrule front end 32 is located adjacent emitter 260T and optical receiver 260R. In this configuration, plug transmit lens LTP is configured as illustrated in the top-down cross-sectional view of FIG. 13A to receive divergent plug transmit light 50T from optical transmitter 260T and form convergent transmit light that is incident upon transmit optical fiber end 44T. Likewise, plug receive lens LRP is configured to receive divergent receive light 50R from receive optical fiber end 44R and form convergent transmit light that is incident upon optical receiver 260R. FIG. 13B is a top-down cross-sectional view similar to FIG. 13A but from farther away to show more of plug 20 and plug ferrule 30.

In this particular configuration, transmit and receive optical fiber ends 44T and 44R are not one focal length away from respective plug transmit and receive lenses LTP and LRP. Rather, transmit and receive optical fiber ends 44T and 44R are each respective operable distances that in an example are two focal lengths away from their respective plug transmit and receive lenses LTP and LRP. Also, in an example, plug transmit and receive lenses LTP and LTR need not reside in the same plane, as these lenses may need to have different respective distances from optical transmitter 260T and optical receiver 260R and also different thickness and lens surface curvatures due to different light transmitting and light receiving angles for these active components.

Integrated Optical Engine with Housing Support Structure

Figure 14:
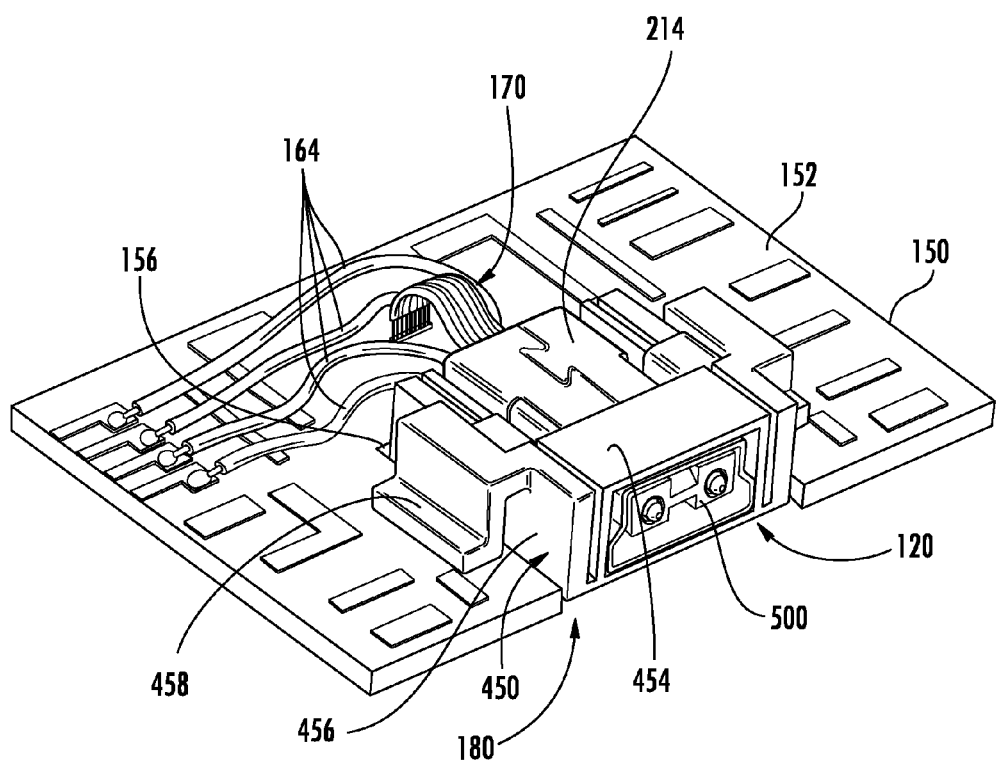
FIG. 14 and FIG. 15 are front and rear elevated views of an example fiber optic interface assembly supported by the circuit board and having a non-tethered configuration.
Figure 15:
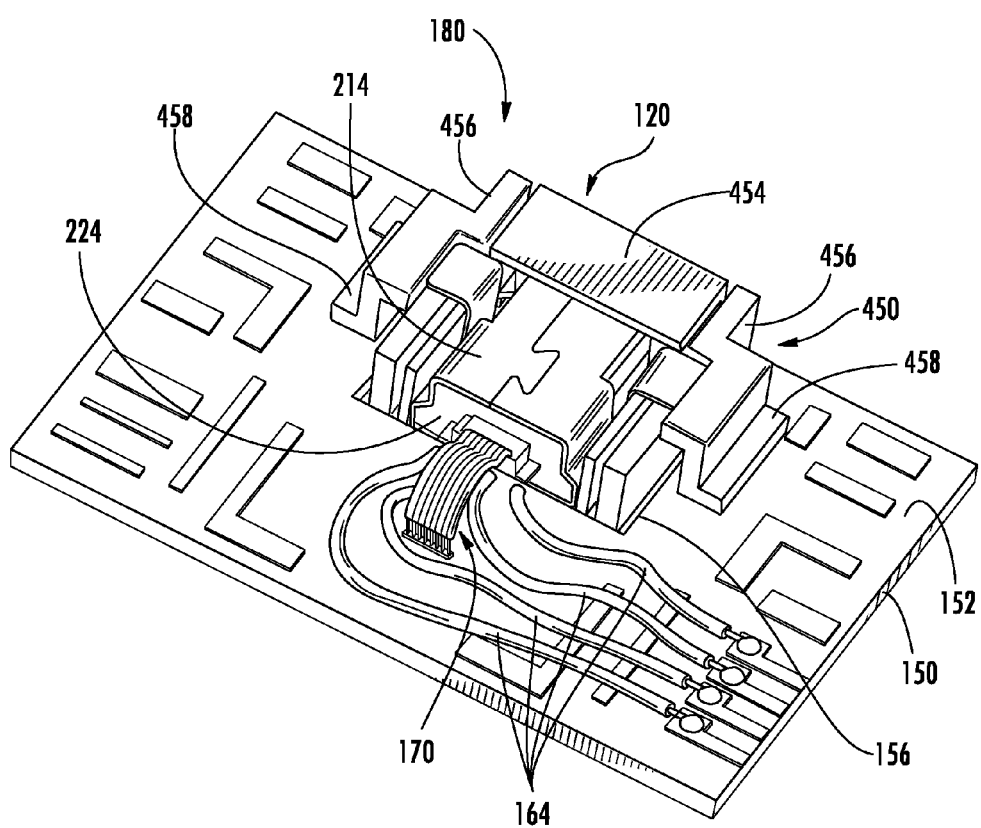

FIG. 14 and FIG. 15 are front and rear elevated views of an example fiber optic interface assembly 180 supported by circuit board 150 in a non-tethered configuration. An example receptacle 120 has a mini-USB configuration suitable for small-form-factor devices 100. The mini-USB configuration for receptacle 120 is defined by a central enclosure 214. However, unlike the unitary construction of integrated optical engine housing 210, the integrated optical engine housing here includes central enclosure 214 supported by a separate support structure 450. In addition, central enclosure 214 includes an interior 224 configured to support a receptacle ferrule 500. Thus, receptacle 120 is defined by central enclosure 214 and ferrule 500 supported therein.

Support structure 450 includes a central section 454 with sides 456. The configuration of support structure 450 is similar to that of integrated optical engine housing 210 in that it includes two support arms 458 attached to respective sides 456 of central section 454. Support arms 458 rest on circuit board upper surface 152 on either side of circuit board slot 156 and act to float (suspend) central section 454 of support structure 450 within slot 156. Support structure central section 454 has a central opening 460 sized to accommodate central enclosure 214, as best seen in the front elevated view of FIG. 16 that omits central enclosure 214 to better show the support structure central section 454. Thus, fiber optic interface assembly 180 is flexibly mounted to circuit board 150 within device enclosure 110 so that receptacle 120 is accessible, for example, at device enclosure side 112.

Figure 17A:
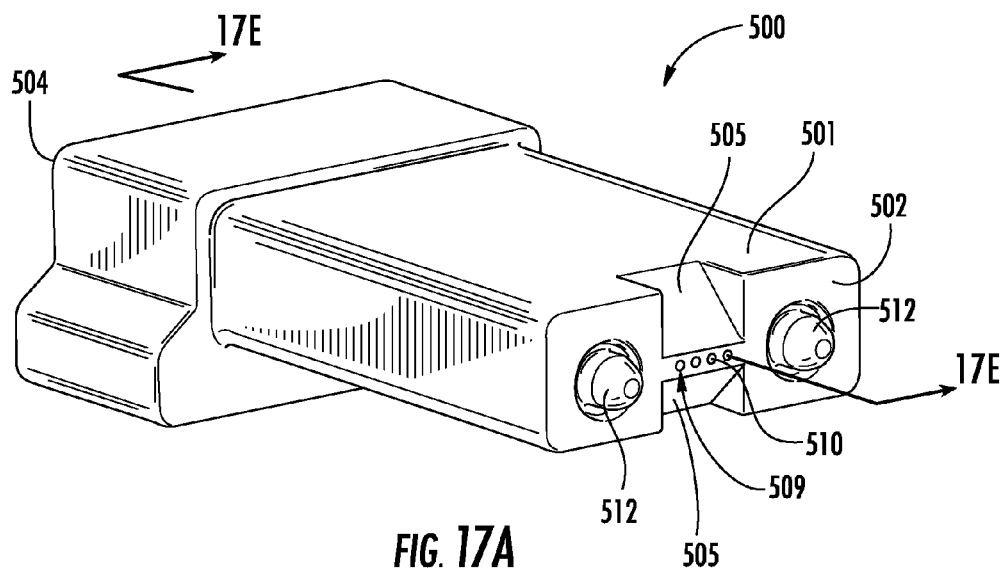
FIG. 17A and FIG. 17B are front and back top elevated views of an example receptacle ferrule.
Figure 17B:
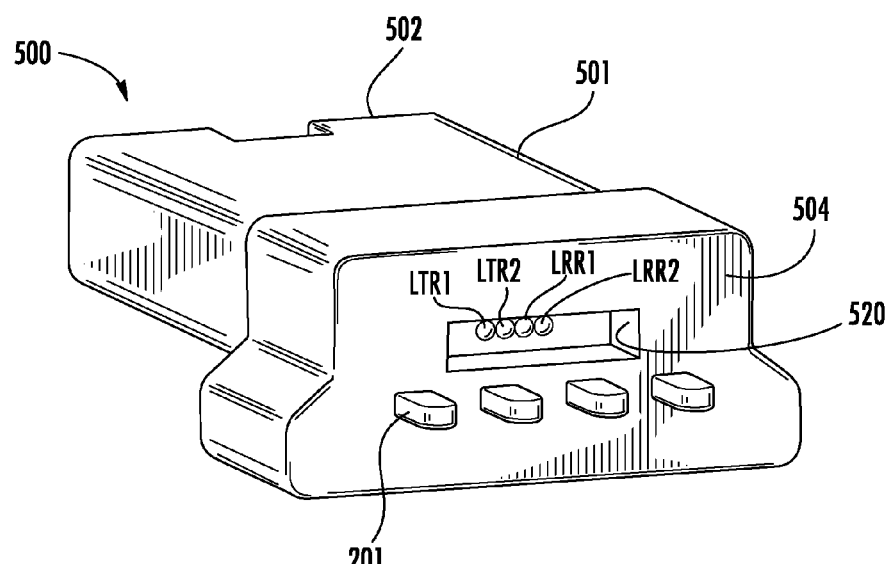
Figure 17C:
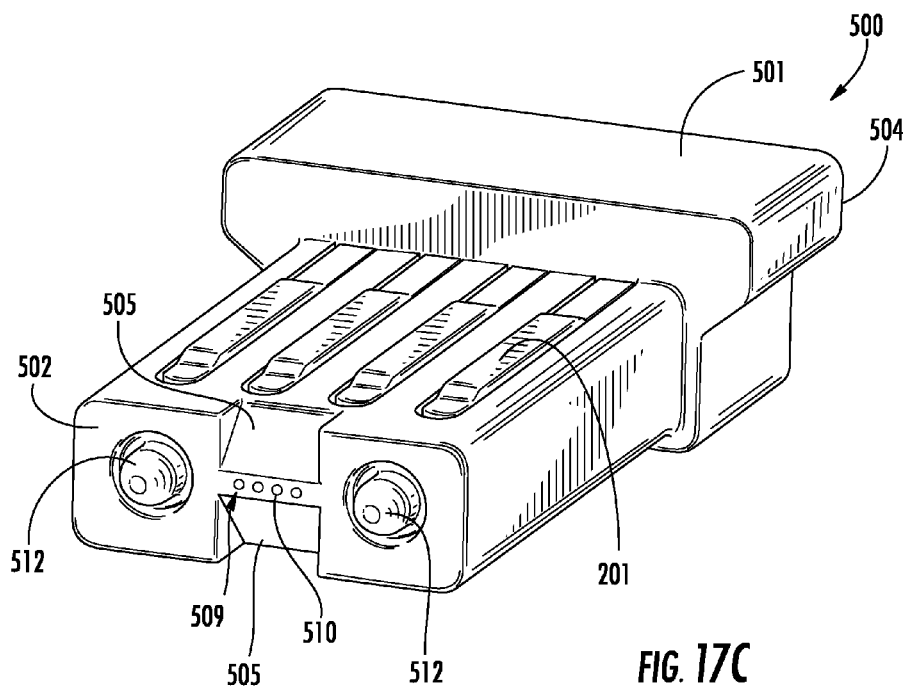
FIG. 17C and FIG. 17D are front and back bottom elevated views of the example receptacle ferrule of FIG. 17A and FIG. 17B.
Figure 17D:
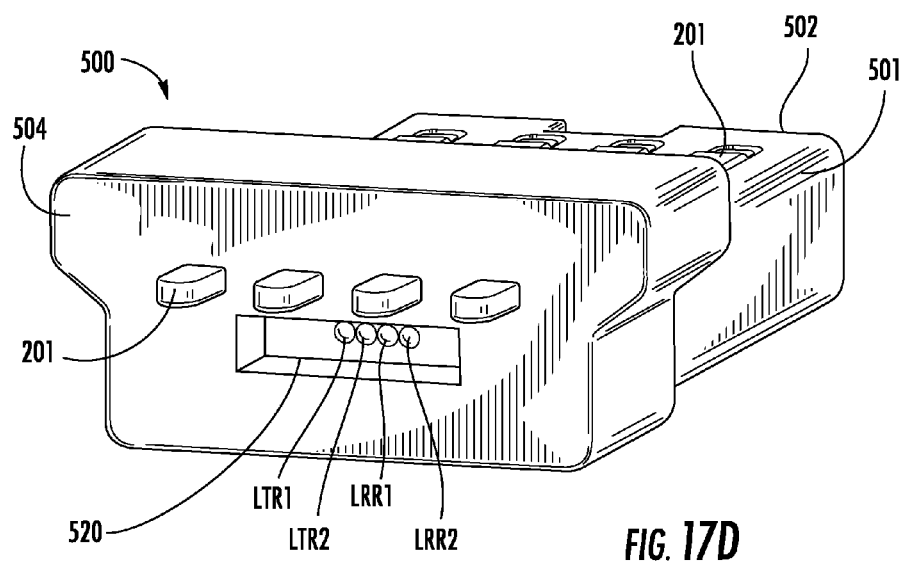
Figure 17E:
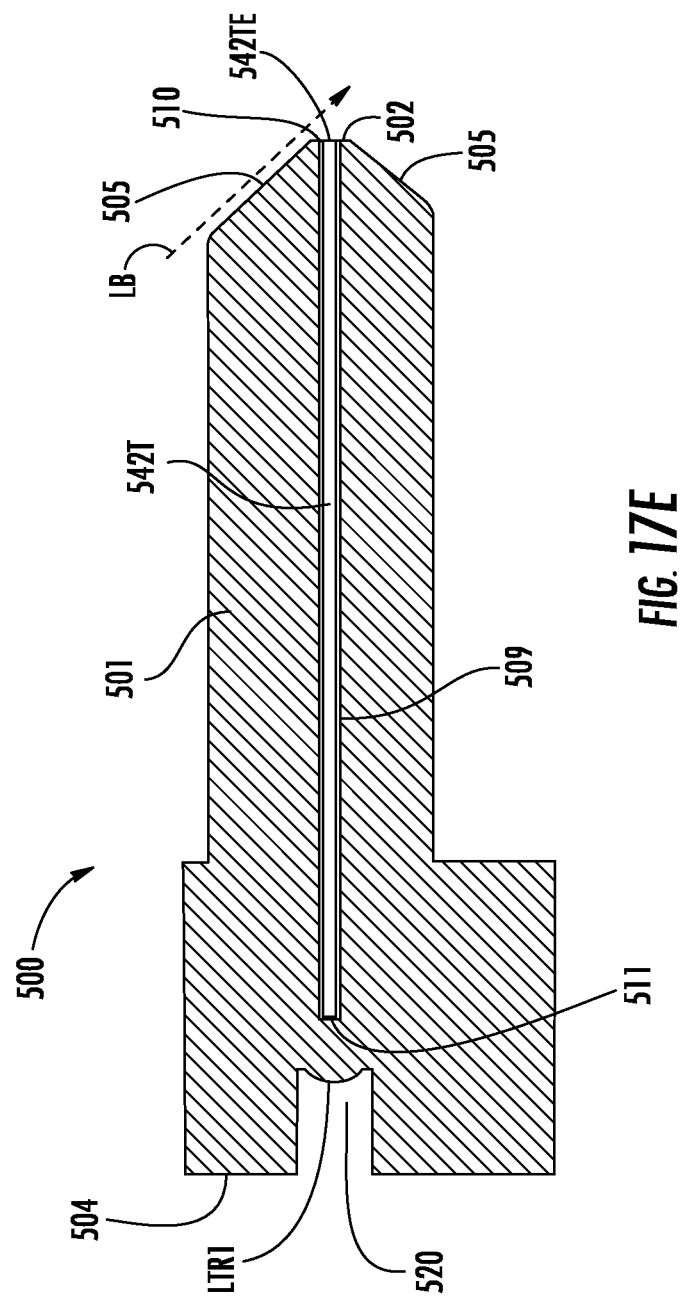
FIG. 17E is a cross-sectional view of the receptacle ferule shown in FIGS. 17A through 17D, the cross-sectional view showing one of the receptacle transmit lenses aligned with a corresponding optical pathway that terminates within the ferrule body and at the ferrule front end and that supports a transmit optical fiber.

FIG. 17A and FIG. 17B are front and back top elevated views of an example receptacle ferrule 500. FIG. 17C and FIG. 17D are front and back bottom elevated views of the example receptacle ferrule 500. Receptacle ferrule 500 includes a ferrule body 501 having front and rear ends 502 and 504. Receptacle ferrule body 501 includes transmit and received optical pathways 509 that run from ferrule body rear end 504 to ferrule body front end 502, and that have optical pathway ends 510 at the ferrule body front end (see FIGS. 20A and 20B, introduced and discussed below). Optical pathways 509 also have a terminal end 511 within ferrule body 501. Example ferrule body optical pathways 509 are bores sized to accommodate respective optical waveguides such as optical fibers 542, as best seen in the cross-sectional view of ferrule 500 as shown in FIG. 17E, with the one optical pathway shown as supporting transmit optical fiber 542T with end 542TE.

In an example, receptacle ferrule front end 502 includes guide pins 512 arranged on either side of optical pathway ends 510. In an example, guide pins 512 are replaced with guide holes that accommodate corresponding guide pins on the front end 32 of plug ferrule 30. Ferrule body 501 includes at least one angled facet 505 adjacent front end 502 and that is aligned with optical pathway ends 510. Angled facet 505 is configured to allow for laser processing of optical fibers 542 supported by optical pathways 509 and that have ends 542TE that can extend from optical pathway ends 510 for laser processing by a laser beam LB, such as illustrated in FIG. 17E.

Receptacle ferrule rear end 504 includes an inset 520 configured to accommodate transmitter-receiver module 250 (best seen in FIGS. 20A, 20B) so that the two optical transmitters 260T1, 260T2 and two optical receivers 260R1 and 260R2 are aligned with respective receptacle lenses LTR1, LTR2, LRR1 and LRR2.

Figure 16:
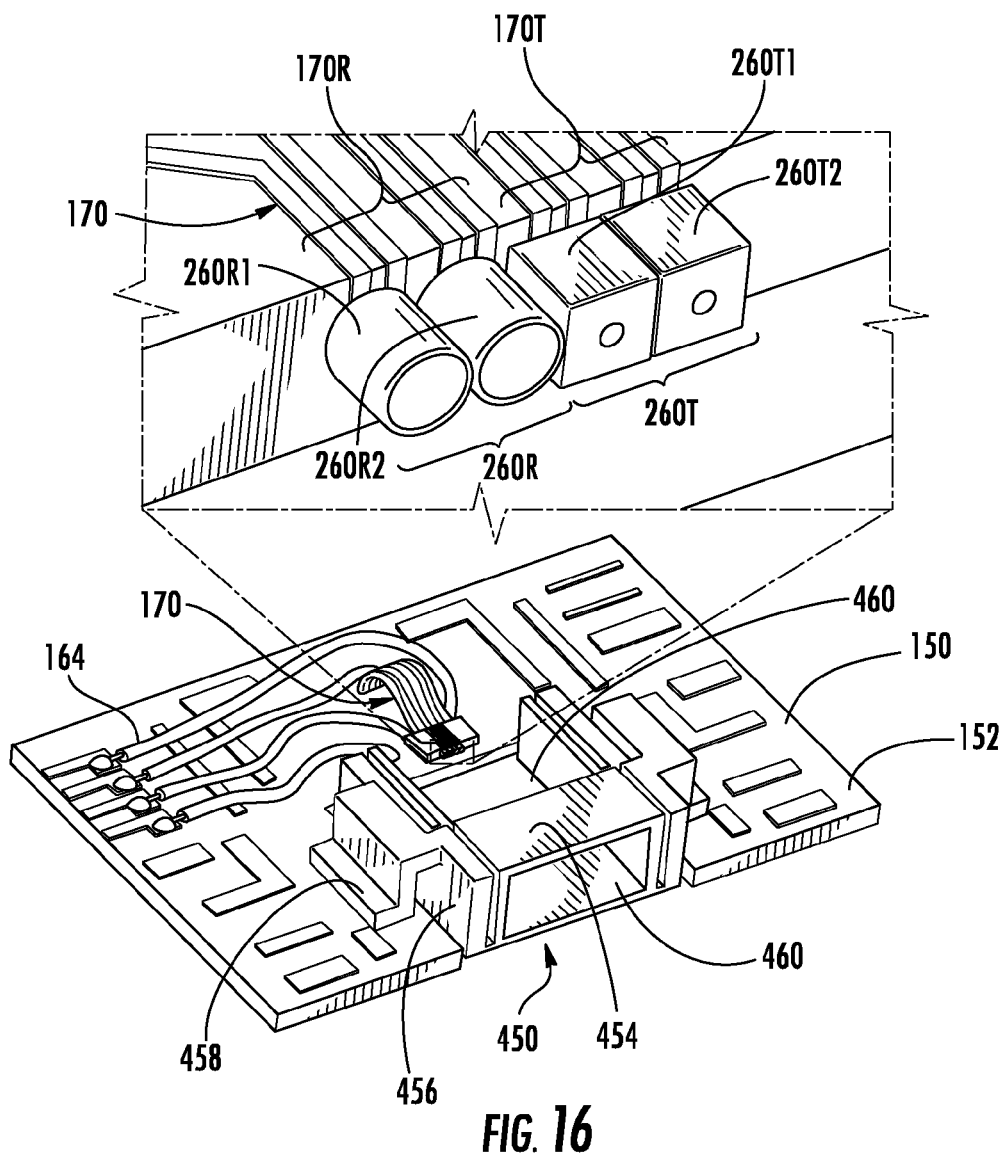
FIG. 16 is a front elevated view of the example fiber optic interface assembly of FIGS. 14 and 15, but without the central enclosure.

With reference again to the close-up inset of FIG. 16, integrated optical engine 200 has two optical transmitters 260T1 and 260T2, and two optical receivers 260R1 and 260R1, which are mounted to circuit board 150 adjacent central enclosure rear end 218 and the slot rear end 158. Transmit and receive signal-conducting wiring 170T and 170R is electrically connected to circuit board contact pads 162 and is respectively electrically connected to optical transmitters 260T1, 260T2 and optical receivers 260R, 260R2. This places optical transmitters 260T1, 260T2 and optical receivers 260R1 and 260R2 adjacent receptacle ferrule rear end 504 and aligned with respective receptacle transmit and receive lenses LTR and LRR.

Figure 18:
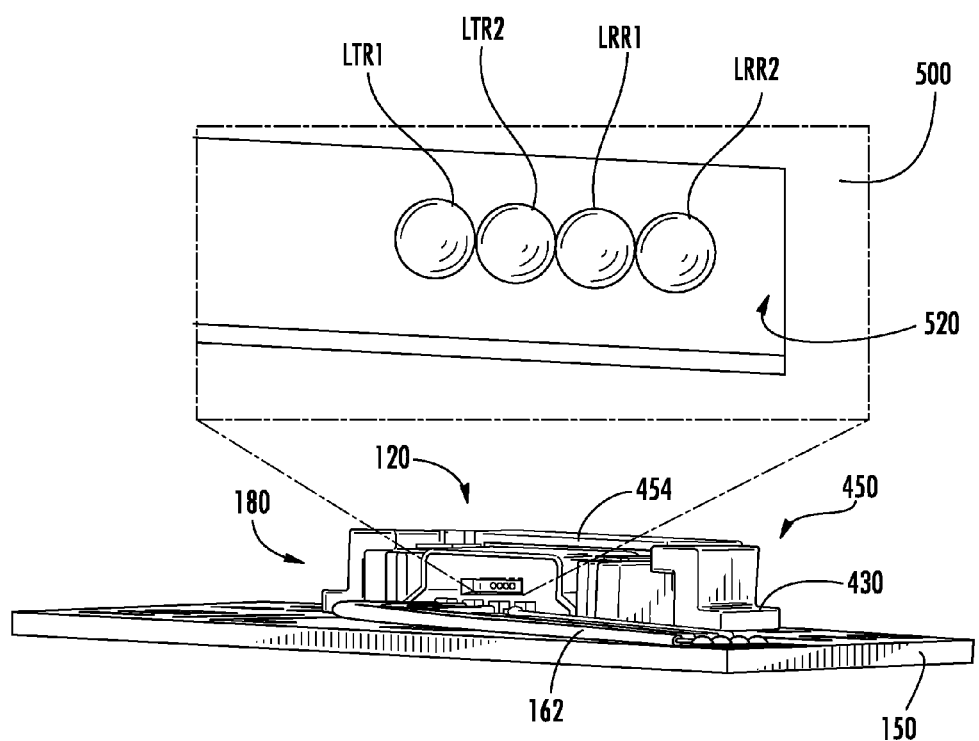
FIG. 18 is a rear-end view and FIG. 19 is an elevated rear-end view of the receptacle central enclosure supported within the support structure central section, and shows in the close-up inset the ferrule transmit and receive lenses and the corresponding optical transmitter and optical receiver.
Figure 19:
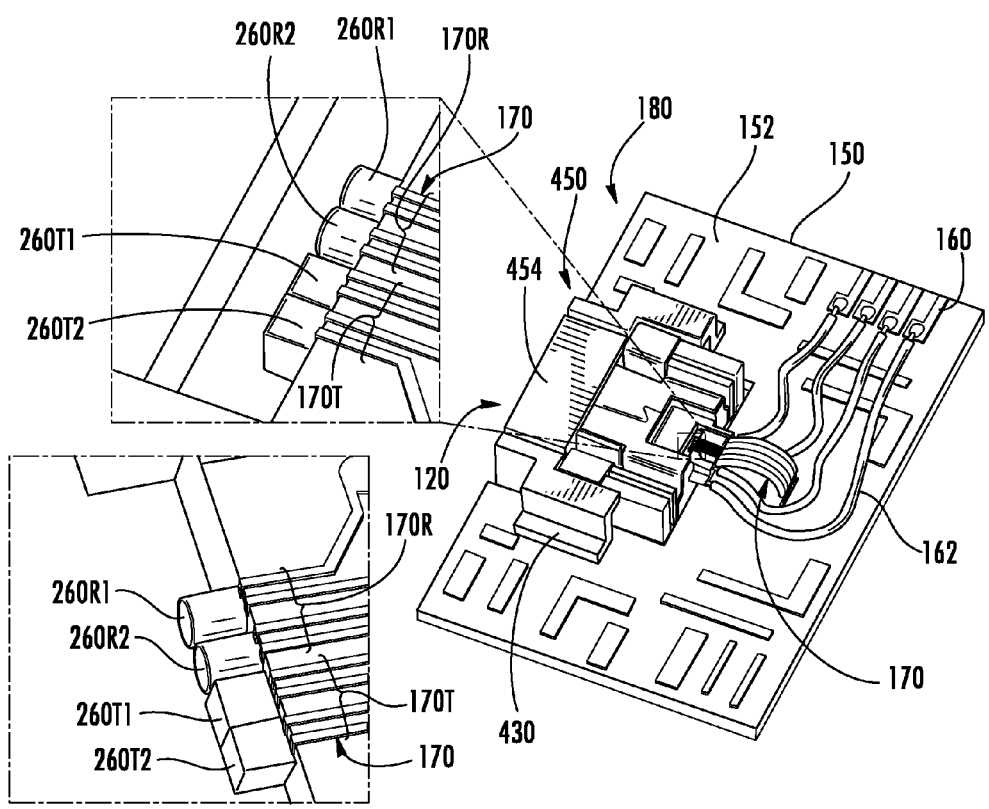

FIG. 18 is a rear-end view and FIG. 19 is an elevated rear-end view of central enclosure 214 supported within support structure central section 454. FIG. 18 shows in the close-up inset the receptacle ferrule transmit lenses LTR1 and LTR2 and the receive lenses LRR1 and LRR2, while FIG. 19 shows optical transmitters 260T1, 260T2 and optical receivers 260R1, 260R2.

Figure 20A:
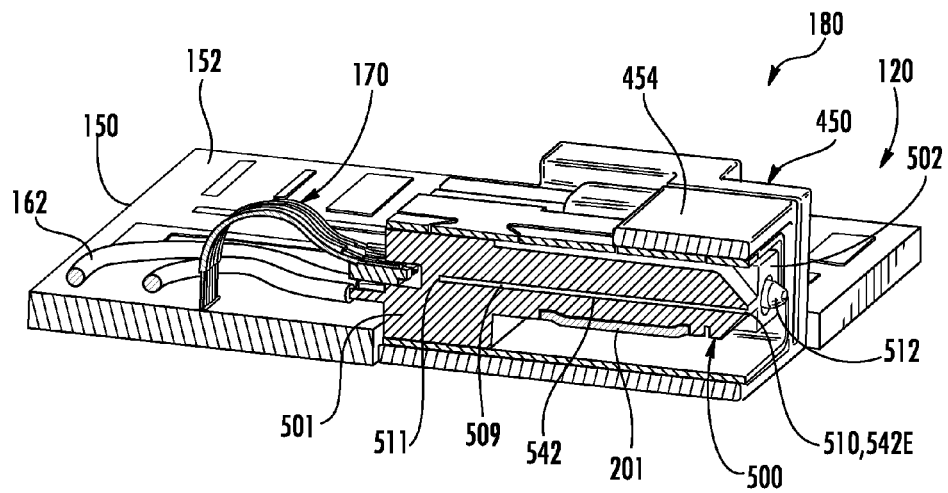
FIG. 20A and FIG. 20B are front elevated and rear elevated cut-away views of an example fiber optic interface assembly with the receptacle central enclosure supported in the central section of the support structure, and the receptacle ferrule supported in the receptacle central enclosure.
Figure 20B:
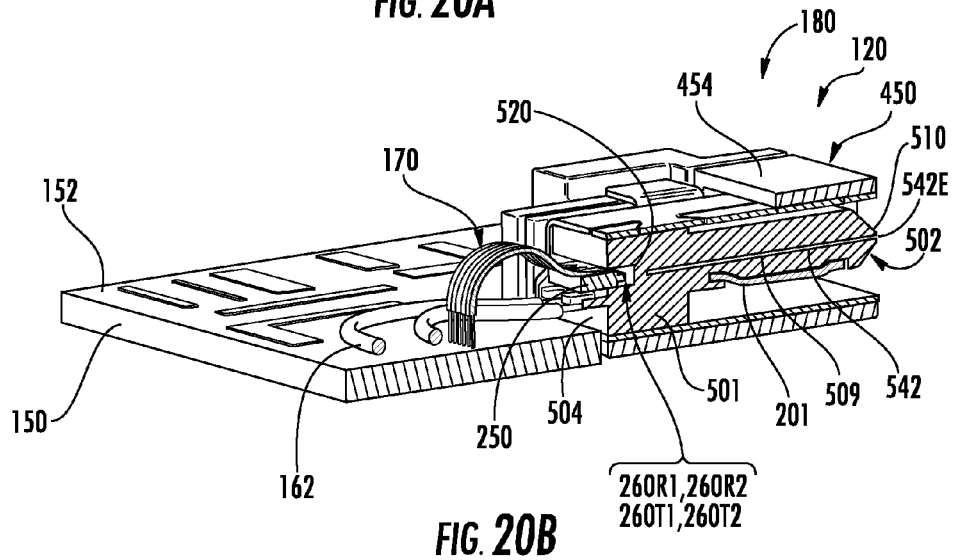

FIG. 20A and FIG. 20B are front elevated and rear elevated cut-away views of fiber optic interface assembly 180 illustrating receptacle central enclosure 214 supported in central section 454 of support structure 450, and receptacle ferrule 500 supported in the receptacle central enclosure. Transmitter-receiver module 250 is disposed in receptacle ferrule rear end inset 520 so that the two optical transmitters 260T1, 260T2 and two optical receivers 260R1 and 260R2 are aligned with respective receptacle lenses LTR1, LTR2, LRR1 and LRR2.

Although the disclosure has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the disclosure and are intended to be covered by the appended claims. It will also be apparent to those skilled in the art that various modifications and variations can be made to the present disclosure without departing from the spirit and scope of the same. Thus, it is intended that the present disclosure cover the modifications and variations of this disclosure provided they come within the scope of the appended claims and their equivalents.

We claim:

1. A fiber optic interface assembly for an electronic device having a circuit board and for interfacing with an external fiber optic cable having a plug, comprising:
   an integrated optical engine configured to transmit and receive respective transmit and receive optical signals; and
   a receptacle integrally formed with the integrated optical engine and having a receptacle aperture configured to receive the plug of the external fiber optic cable; and
   the receptacle supported by a flexible mount supported by the circuit board, the flexible mount having at least one flexible member configured to absorb a mechanical force when the plug is mated to the receptacle.

2. The fiber optic interface assembly of claim 1, further comprising:
   the circuit board, the circuit board having an upper surface and an edge with an enclosure support area formed therein;
   the integrated optical engine having a housing with a central enclosure that defines the receptacle and receptacle aperture and a receptacle interior; and
   the flexible mount connected to the central enclosure and to the circuit board to flexibly support the central housing within the enclosure support area.

3. The fiber optic interface assembly of claim 2, further comprising:
   the flexible mount having first and second outboard members flexibly attached to the central enclosure by respective first and second flexible members, the first and second outboard members being supported by the circuit board adjacent opposite edges of the enclosure support area so that the central enclosure floats within the enclosure support area.

4. The fiber optic interface assembly of claim 2, further comprising:
   the central enclosure having a rear end and an internal rear wall within the receptacle interior, the interior rear wall having receptacle transmit and receive lenses; and
   the integrated optical engine having an optical transmitter and an optical receiver each arranged adjacent the central enclosure rear wall and respectively aligned with and located at an operable distance from the receptacle transmit and receive lenses.

5. The fiber optic interface assembly of claim 2, further comprising:
   the circuit board having at least one electrical line formed thereon;
   at least one receptacle electrical contact electrically connected to the at least one electrical line and disposed at least partially within the receptacle interior; and
   the plug, with the plug having at least one plug electrical contact configured to electrically contact the at least one receptacle electrical contact when the plug is mated to the receptacle.

6. The fiber optic interface assembly of claim 2, further comprising:
   the central enclosure having a height HE, a component operably supported on the circuit board upper surface and having a height HC, and where HE>HC.

7. The fiber optic interface assembly of claim 2, further comprising:
   the central enclosure having a rear end and an internal rear wall within the receptacle interior, the interior rear wall having receptacle transmit and receive lenses each having a focal length FR, with at least one cut-out in the rear end; and
   the integrated optical engine having an optical transmitter and an optical receiver each arranged in the at least one cut out and respectively aligned with and located about a distance FR from the receptacle transmit and receive lenses.

8. The fiber optic interface assembly of claim 7, further comprising:
   the plug, with the plug having a ferrule with a front end, the front having plug transmit and receive, with the plug transmit and receive lenses arranged to confront the receptacle transmit and receive lenses when the plug is mated to the receptacle.

9. The fiber optic interface assembly of claim 8, further comprising the external fiber optic cable operably mated to the receptacle with the plug.

10. The fiber optic interface assembly of claim 2, wherein the plug includes plug transmit and receive lenses, and further comprising:
    the integrated optical engine having an optical transmitter and an optical receiver each operably arranged on the circuit board; and
    transmit and receive light guides respectively optically coupled at first ends to the optical transmitter and optical receiver and respectively optically coupled at second ends to the plug transmit and receive lenses when the plug is mated to the receptacle.

11. The fiber optic interface assembly of claim 10, further comprising:
    the central enclosure having a lead-in channel configured to lead a portion of the transmit and receive light guides into the central enclosure interior so the transmit and receive light guide second ends respectively reside at an operative distance away from the plug transmit and receive lenses.

12. The fiber optic interface assembly of claim 10, further comprising:
    the external fiber optic cable operably mated to the receptacle with the plug.

13. The fiber optic interface assembly of claim 1, wherein the plug includes plug transmit and receive lenses, and further comprising:
    the central enclosure having an open rear end; and
    the integrated optical engine having an optical transmitter and an optical receiver each arranged adjacent the central enclosure rear end and respectively aligned with and located at an operable distance from the plug transmit and receive lenses when the plug is mated to the receptacle.

14. The fiber optic interface assembly of claim 13, further comprising the external fiber optic cable operably mated to the receptacle with the plug.

15. A fiber optic interface assembly for an electronic device for interfacing with a plug of a fiber optic cable, comprising:
    a circuit board having an end with an enclosure support area formed therein, the enclosure support area having opposite edges and a back end;
    an optical transmitter and an optical receiver operably disposed on the circuit board and respectively configured to transmit and receive respective transmit and receive optical signals;
    a central enclosure configured to support a receptacle ferrule, the central enclosure and receptacle ferrule defining a receptacle; and an enclosure support structure having a flexible mount configured to flexibly support the central enclosure within the enclosure support area so that the receptacle ferrule is operably arranged relative to the optical transmitter and optical receiver.

16. The fiber optic interface assembly according to claim 15, wherein the receptacle has a mini-USB configuration.

17. The fiber optic interface assembly according to claim 15, wherein the central enclosure has an open rear end so that the optical transmitter and optical receiver are arranged immediately adjacent a rear end of the receptacle ferrule.

18. The fiber optic interface assembly according to claim 15, wherein the enclosure support area is selected from one of a slot, recess, offset, aperture, and relief zone.

19. The fiber optic interface assembly of claim 15, further comprising:
the circuit board having an upper surface, a component operably supported on the circuit board upper surface and having a height HC, the central enclosure having a height HE, and where HE>HC.

20. A fiber optic interface assembly for an electronic device having a housing, for interfacing with an external fiber optic cable having a plug, comprising:
a circuit board having an end with an enclosure support area formed therein, the enclosure support area having opposite sides and a rear end;
an optical transmitter and an optical receiver operably disposed on the circuit board adjacent the enclosure support area rear end and respectively configured to transmit and receive respective transmit and receive optical signals; and
a receptacle having a receptacle central enclosure that has sides configured to slidingly engage the sides of the enclosure support area to mate the receptacle central enclosure with the circuit board, the receptacle central enclosure having upper and lower flanges for connecting to upper and lower portions of the electronic device housing, the receptacle central enclosure having a receptacle aperture.

21. The fiber optic interface assembly of claim 20, further comprising:
the plug, with the plug having a ferrule with a front end, the front having plug transmit and receive lenses, with the plug transmit and receive lenses respectively arranged at an operable distance from the optical transmitter and optical receiver when the plug is mated to the receptacle.

22. The fiber optic interface assembly according to claim 20, wherein the enclosure support area is selected from one of a slot, recess, offset, aperture, and relief zone.

23. The fiber optic interface assembly of claim 20, further comprising:
the circuit board having an upper surface, a component operably supported on the circuit board upper surface and having a height HC, the central enclosure having a height HE, and where HE>HC.

24. A fiber optic interface assembly for an electronic device having a housing, for interfacing with an external fiber optic cable having a plug, comprising:
a circuit board;
a central enclosure having a front end and a rear end;
an optical transmitter and an optical receiver arranged adjacent the rear end of the central enclosure and electrically connected to the circuit board by signal conducting wires to transmit and receive respective optical signals; and
a receptacle transmit lens and a receptacle receive lens, wherein the optical transmitter and the optical receiver are respectively aligned with the receptacle transmit lens and the receptacle receive lens.

25. The fiber optic interface assembly of claim 24, further including transmit and receive lenses that are arranged at a distance of about one focal length away from the respective optical transmitter and optical receiver.

* * * * *